US012757254B2

(12) United States Patent
Khan Beigi et al.

(10) Patent No.: US 12,757,254 B2
(45) Date of Patent: Oct. 6, 2026

(54) METHODS FOR PRACH IN HIGHER FREQUENCIES

(71) Applicant: INTERDIGITAL PATENT HOLDINGS, INC., Wilmington, DE (US)

(72) Inventors: Nazli Khan Beigi, Longueuil (CA); Young Woo Kwak, Woodbury, NY (US); Moon Il Lee, Melville, NY (US); Paul Marinier, Brossard (CA); Patrick Tooher, Montreal (CA); Faris Alfarhan, Montreal (CA)

(73) Assignee: INTERDIGITAL PATENT HOLDINGS, INC., Wilmington, DE (US)

( * ) Notice: Subject to any disclaimer, the term of this patent is extended or adjusted under 35 U.S.C. 154(b) by 287 days.

(21) Appl. No.: 18/293,803

(22) PCT Filed: Aug. 3, 2022

(86) PCT No.: PCT/US2022/039329
§ 371 (c)(1),
(2) Date: Jan. 31, 2024

(87) PCT Pub. No.: WO2023/014831
PCT Pub. Date: Feb. 9, 2023

(65) Prior Publication Data

US 2024/0349346 A1 Oct. 17, 2024

Related U.S. Application Data

(60) Provisional application No. 63/253,934, filed on Oct. 8, 2021, provisional application No. 63/228,924, filed on Aug. 3, 2021.

(51) Int. Cl.
*H04W 74/0833* (2024.01)
*H04W 74/0808* (2024.01)
*H04W 74/0838* (2024.01)

(52) U.S. Cl.
CPC ... *H04W 74/0833* (2013.01); *H04W 74/0808* (2013.01); *H04W 74/0838* (2024.01)

(58) Field of Classification Search
CPC ......... H04W 74/0808; H04W 74/0833; H04W 74/0838
See application file for complete search history.

(56) References Cited

U.S. PATENT DOCUMENTS

2020/0045735 A1* 2/2020 Kim ...................... H04W 52/36
2020/0296635 A1* 9/2020 Rastegardoost ...... H04L 5/0048
(Continued)

FOREIGN PATENT DOCUMENTS

WO 2019/245779 12/2019

OTHER PUBLICATIONS

Third Generation Partnership Project, "Technical Specification Group Radio Access Network; NR; Physical layer procedures for control (Release 16)," 3GPP TS 38.213 V16.1.0 (Mar. 2020).
(Continued)

*Primary Examiner* — Harry H Kim
(74) *Attorney, Agent, or Firm* — Volpe Koenig

(57) ABSTRACT

Methods and devices to extend the Channel Occupancy Time (COT) for LBT-free PRACH transmission across consecutive ROs based on blind detection are disclosed. Methods and devices to extend the COT for LBT-free PRACH transmission in case of one or more unused ROs across the consecutive ROs based on dynamic indication from gNB are disclosed. Methods and devices to determine the mode of operation based on the cover-codes are disclosed. Method and devices to support the PRACH trans-
(Continued)

mission from a WTRU in multiple consecutive ROs are disclosed.

16 Claims, 12 Drawing Sheets

(56) References Cited

U.S. PATENT DOCUMENTS

| | | | | |
|---|---|---|---|---|
| 2021/0014694 | A1 | 1/2021 | Li et al. | |
| 2022/0304060 | A1* | 9/2022 | Sakhnini | H04W 74/0833 |
| 2023/0413324 | A1* | 12/2023 | Li | H04W 74/002 |
| 2025/0358749 | A1* | 11/2025 | Kim | H04W 36/087 |
| 2025/0393040 | A1* | 12/2025 | Huang | H04W 72/0453 |

OTHER PUBLICATIONS

Third Generation Partnership Project, "Technical Specification Group Radio Access Network; NR; Physical layer procedures for control (Release 16)," 3GPP TS 38.213 V16.6.0 (Jun. 2021).
Third Generation Partnership Project, "Technical Specification Group Radio Access Network; NR; Physical layer procedures for control (Release 16)," 3GPP TS 38.213 V16.10.0 (Jun. 2022).
Third Generation Partnership Project, "Technical Specification Group Radio Access Network; NR; Physical layer procedures for control (Release 17)," 3GPP TS 38.213 V17.2.0 (Jun. 2022).
Third Generation Partnership Project, "Technical Specification Group Radio Access Network; NR; Medium Access Control (MAC) protocol specification (Release 16)," 3GPP TS 38.321 V16.0.0 (Mar. 2020).
Third Generation Partnership Project, "Technical Specification Group Radio Access Network; NR; Medium Access Control (MAC) protocol specification (Release 16)," 3GPP TS 38.321 V16.5.0 (Jun. 2021).
Third Generation Partnership Project, "Technical Specification Group Radio Access Network; NR; Medium Access Control (MAC) protocol specification (Release 16)," 3GPP TS 38.321 V16.9.0 (Jun. 2022).
Third Generation Partnership Project, "Technical Specification Group Radio Access Network; NR; Medium Access Control (MAC) protocol specification (Release 17)," 3GPP TS 38.321 V17.1.0 (Jun. 2022).
Third Generation Partnership Project, "Technical Specification Group Radio Access Network; NR; Radio Resource Control (RRC) protocol specification (Release 16)," 3GPP TS 38.331 V16.0.0 (Mar. 2020).
Third Generation Partnership Project, "Technical Specification Group Radio Access Network; NR; Radio Resource Control (RRC) protocol specification (Release 16)," 3GPP TS 38.331 V16.5.0 (Jun. 2021).
Third Generation Partnership Project, "Technical Specification Group Radio Access Network; NR; Radio Resource Control (RRC) protocol specification (Release 16)," 3GPP TS 38.331 V16.9.0 (Jun. 2022).
Third Generation Partnership Project, "Technical Specification Group Radio Access Network; NR; Radio Resource Control (RRC) protocol specification (Release 17)," 3GPP TS 38.331 V17.1.0 (Jun. 2022).
Third Generation Partnership Project, "Technical Specification Group Radio Access Network; NG Radio Access Network (NG-RAN); Stage 2 functional specification of User Equipment (UE) positioning in NG-RAN (Release 16)," 3GPP TS 38.305 V16.5.0 (Jun. 2021).
Third Generation Partnership Project, "Technical Specification Group Radio Access Network; NG Radio Access Network (NG-RAN); Stage 2 functional specification of User Equipment (UE) positioning in NG-RAN (Release 16)," 3GPP TS 38.305 V16.7.0 (Dec. 2021).
Third Generation Partnership Project, "Technical Specification Group Radio Access Network; NG Radio Access Network (NG-RAN); Stage 2 functional specification of User Equipment (UE) positioning in NG-RAN (Release 17)," 3GPP TS 38.305 V17.1.0 (Jun. 2022).
Third Generation Partnership Project, "Technical Specification Group Radio Access Network; Study on Scenarios and Requirements for Next Generation Access Technologies; (Release 16)," 3GPP TR 38.913 V16.0.0 (Jul. 2020).
Third Generation Partnership Project, "Technical Specification Group Radio Access Network; Study on Scenarios and Requirements for Next Generation Access Technologies; (Release 17)," 3GPP TR 38.913 V17.0.0 (Mar. 2022).
Third Generation Partnership Project, "Technical Specification Group Radio Access Network; NR; Physical channels and modulation (Release 16)," 3GPP TS 38.211 V16.6.0 (Jun. 2021).
Third Generation Partnership Project, "Technical Specification Group Radio Access Network; NR; Physical channels and modulation (Release 16)," 3GPP TS 38.211 V16.10.0 (Jun. 2022).
Third Generation Partnership Project, "Technical Specification Group Radio Access Network; NR; Physical channels and modulation (Release 17)," 3GPP TS 38.211 V17.2.0 (Jun. 2022).
Third Generation Partnership Project, "Technical Specification Group Radio Access Network; Study on requirements for NR beyond 52.6 GHz (Release 16)," 3GPP TR 38.807 V16.0.0 (Dec. 2019).
Third Generation Partnership Project, "Technical Specification Group Radio Access Network; Study on requirements for NR beyond 52.6 GHz (Release 16)," 3GPP TR 38.807 V16.1.0 (Mar. 2021).
IEEE Standard for Information technology—Telecommunications and information exchange between systems—Local and metropolitan area networks—Specific requirements; Part 11: Wireless LAN Medium Access Control (MAC) and Physical Layer (PHY) Specifications; Amendment 4: Enhancements for Very High Throughput for Operation in Bands below 6GHz, IEEE Std 802.11ac-2013 (Dec. 11, 2013).
IEEE Standard for Information Technology—Telecommunications and information exchange between systems—Local and metropolitan area networks—Specific requirements; Part 11: Wireless LAN Medium Access Control (MAC) and Physical Layer (PHY) specifications; Amendment 5: Television White Spaces (TVWS) Operation, IEEE 802.11af-2013 (Dec. 11, 2013).
IEEE Standard for Information technology—Telecommunications and information exchange between systems—Local and metropolitan area networks—Specific requirements; Part 11: Wireless LAN Medium Access Control (MAC) and Physical Layer (PHY) Specifications; Amendment 5: Enhancements for Higher Throughput, IEEE Std 802.11n-2009 (Sep. 2009).
IEEE Standard for Information technology—Telecommunications and information exchange between systems Local and metropolitan area networks—Specific requirements; Part 11: Wireless LAN Medium Access Control (MAC) and Physical Layer (PHY) Specifications; Amendment 2: Sub 1 GHz License Exempt Operation, IEEE 802.11ah-2016 (Dec. 7, 2016).
IEEE Standard for Information technology—Telecommunications and information exchange between systems—Local and metropolitan area networks—Specific requirements; Part 11: Wireless LAN Medium Access Control (MAC) and Physical Layer (PHY) Specifications, IEEE Std. 802.11-2020 (Dec. 3, 2020).
Intel Corporation, "New SID: Study on supporting NR from 52.6GHz to 71 Ghz," 3GPP TSG RAN Meeting #86, RP-193259, Sitges, Spain (Dec. 9-12, 2019).
Qualcomm, "New WID on Extending current NR operation to 71 GHz," 3GPP TSG RAN Meeting #86, RP-193229, Sitges, Spain (Dec. 9-12, 2019).
Intel Corporation, "New SID: Study on NR beyond 52.6GHz," 3GPP TSG RAN Meeting #80, RP-181435, La Jolla, USA (Jun. 11-14, 2018).
Interdigital, Inc., "Discussions on initial access signals and channels for operation in 52.6-71GHz," 3GPP TSG RAN WG1 #106e, R1-2106766 e-Meeting (Aug. 16-27, 2021).
Interdigital, Inc., "Discussions on initial access signals and channels for operation in 52.6-71GHz," 3GPP TSG RAN WG1 #106bis-e, R1-2109903, e-Meeting (Oct. 11-19, 2021).

(56) References Cited

OTHER PUBLICATIONS

Interdigital, Inc., "Discussions on initial access signals and channels for operation in 52.6-71GHz," 3GPP TSG RAN WG1 #107bis-e, R1-2111832, e-Meeting (Nov. 11-19, 2021).
Interdigital, Inc., "Remaining issues for initial access operation in 52.6-71GHz," 3GPP TSG RAN WG1 #107bis-e, R1-2200059, e-Meeting (Jan. 17-25, 2022).

* cited by examiner

METHODS FOR PRACH IN HIGHER FREQUENCIES

CROSS-REFERENCE TO RELATED APPLICATIONS

This application is the U.S. National Stage, under 35 U.S.C. § 371, of International Application No. PCT/US2022/039329 filed Aug. 3, 2022, which claims the benefit of U.S. Provisional Application No. 63/228,924, filed Aug. 3, 2021, and U.S. Provisional Application No. 63/253,934, filed Oct. 8, 2021, the contents of which are incorporated herein by reference.

BACKGROUND

New Radio (NR) beyond 52.6 GHz is being explored. This technology could be the great foundation for the future high data rate frameworks. The realization of beyond 52.6 GHz systems is subject to resolving the key challenges raised due to the special channel and radiation characteristics.

An update WID to extend the NR operation to 71 GHz considering both licensed and unlicensed operation is being explored. As part of the WID, the study for RO configuration was included for non-consecutive RACH occasions (RO) in time domain for operation in shared spectrum. The 120 kHz subcarrier spacing (SCS) was agreed to be supported for the initial access related signals/channels in initial BWP. Also, additional SCS (480 kHz, 960 kHz) for initial access related signals/channels in initial BWP are part of the studies.

SUMMARY

Methods and devices to extend the Channel Occupancy Time (COT) for LBT-free PRACH transmission across consecutive ROs based on blind detection are disclosed.

Methods and devices to extend the COT for LBT-free PRACH transmission in case of one or more unused ROs across the consecutive ROs based on dynamic indication from gNB are disclosed.

Methods and devices to determine the mode of operation based on the cover-codes are disclosed.

Methods and devices to support the PRACH transmission from a WTRU in multiple consecutive ROs are disclosed.

Methods and devices to support the decomposition of PRACH occasions for operation without beam switching gaps between consecutive ROs are disclosed. The WTRU re-allocates original ROs by halving the frequency resources into two consecutive ROs in time domain denoted as RO-pairs. The WTRU expects the switching of the antennas corresponding to the ROs mapped to the first RO within a RO-pair (first half of the original RO) to take place during the second RO within the RO-pair (second half of the original ROs) without switching gaps.

A system and method in a wireless transmit/receive unit (WTRU) for physical random-access channel (PRACH) transmission is disclosed. The system and method include receiving a configuration of PRACH information, the PRACH information including at least one candidate cover-code, performing listen before talk (LBT) in a first random-access channel (RACH) occasion (RO) that is prior to a second RO, on a condition that the LBT is not successful, detecting if there is a first PRACH preamble transmission in the first RO scrambled with a first cover-code from among the at least one candidate cover-code, and based on the detecting, transmitting a second PRACH preamble scrambled with a second cover-code from among the at least one candidate cover-code in the second RO.

The system and method may include the transmitting occurs when the first cover-code is successfully detected in the first RO.

The system and method further comprising based on the detecting, no PRACH preamble is to be transmitted in the second RO due to the LBT failure. The system and method wherein the not transmitting occurs if none of the at least one candidate cover-codes is successfully detected in the first RO.

The system and method further comprising, on a condition that the LBT is successful, transmitting a third PRACH preamble scrambled with a third cover code from among the at least one candidate cover-code in the second RO.

The system and method wherein the detecting if there is a first PRACH preamble transmission in the first RO scrambled with a first cover-code from among the at least one candidate cover-codes enables the WTRU to further determine if the channel is busy.

When the cover-code is detected, the system and method further comprising transmitting PRACH preamble scrambled with the determined cover-code.

The system and method in a wireless transmit/receive unit (WTRU) for physical random-access channel (PRACH) transmission including receiving a configuration of PRACH information, the PRACH information including at least one candidate cover-code, performing listen before talk (LBT) in a first random-access channel (RACH) occasion (RO) that is prior to a second RO, on a condition that the LBT is not successful, detecting if there is a first PRACH preamble transmission in the first RO scrambled with a first cover-code from among the at least one candidate cover-code, and on a condition that the first PRACH preamble transmission scrambled with the first cover-code is detected in the first RO, transmitting a second PRACH preamble scrambled with a second cover-code from among the at least one candidate cover-code in the second RO.

The system and method including, on a condition that no PRACH preamble transmission scrambled with a cover-code from among the at least one candidate cover-code is detected in the first RO, no PRACH preamble is to be transmitted in the second RO due to the LBT failure.

The system and method further comprising, on a condition that the LBT is successful, transmitting a third PRACH preamble scrambled with a third cover code from among the at least one candidate cover-code in the second RO.

BRIEF DESCRIPTION OF THE DRAWINGS

A more detailed understanding may be had from the following description, given by way of example in conjunction with the accompanying drawings, wherein like reference numerals in the figures indicate like elements, and wherein.

DETAILED DESCRIPTION

Methods and devices to extend the Channel Occupancy Time (COT) for LBT-free PRACH transmission across consecutive ROs based on blind detection are disclosed.

Methods and devices to extend the COT for LBT-free PRACH transmission in case of one or more unused ROs across the consecutive ROs based on dynamic indication from gNB are disclosed.

Methods and devices to determine the mode of operation based on the cover-codes are disclosed.

Methods and devices to support the PRACH transmission from a WTRU in multiple consecutive ROs are disclosed.

Methods and devices to support the decomposition of PRACH occasions for operation without beam switching gaps between consecutive ROs are disclosed. The WTRU re-allocates original ROs by halving the frequency resources into two consecutive ROs in time domain denoted as RO-pairs. The WTRU expects the switching of the antennas corresponding to the ROs mapped to the first RO within a RO-pair (first half of the original RO) to take place during the second RO within the RO-pair (second half of the original ROs) without switching gaps.

Figure 1A:
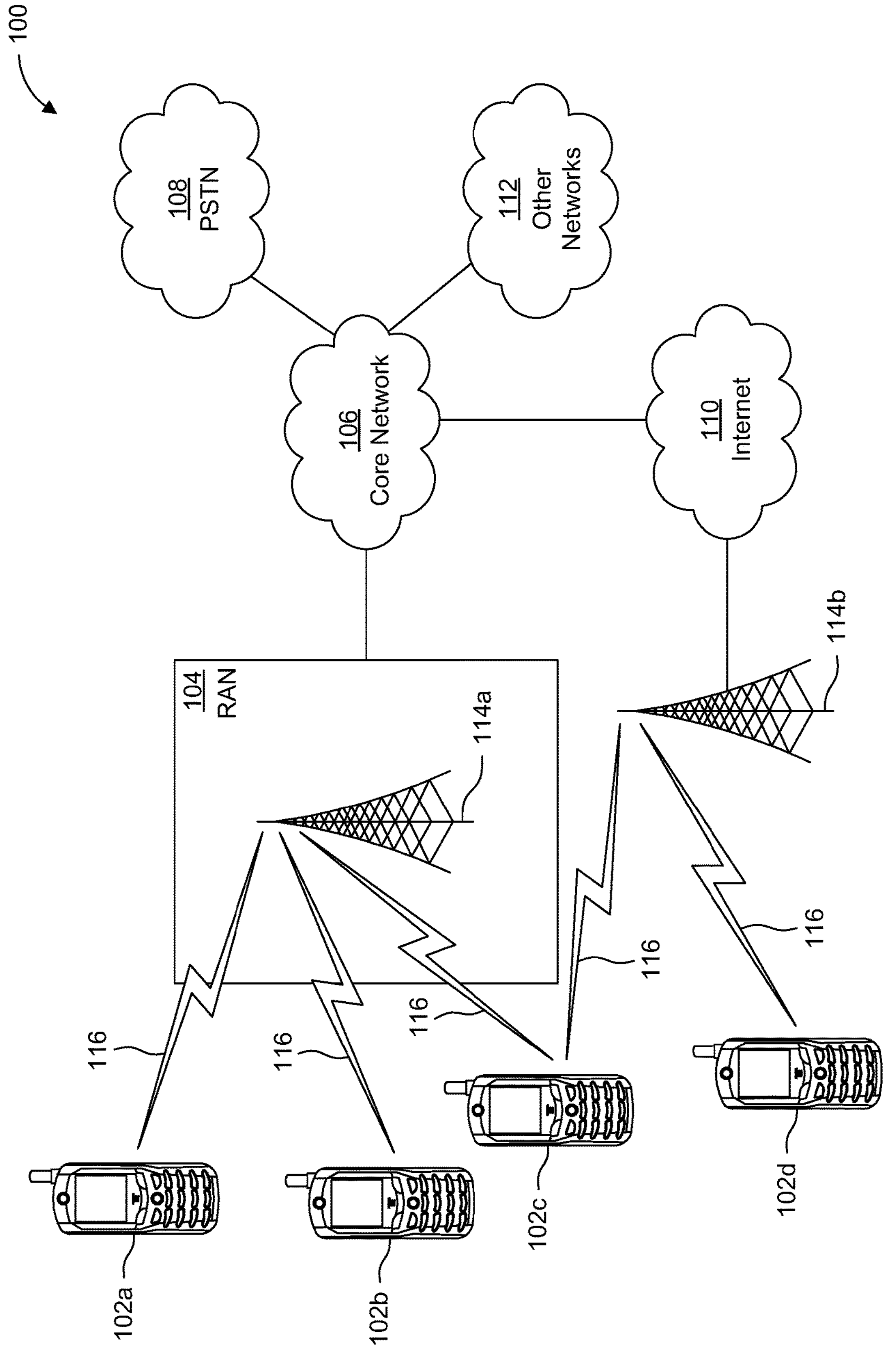
FIG. 1A is a system diagram illustrating an example communications system in which one or more disclosed embodiments may be implemented.

FIG. 1A is a diagram illustrating an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), zero-tail unique-word discrete Fourier transform Spread OFDM (ZT-UW-DFT-S-OFDM), unique word OFDM (UW-OFDM), resource block-filtered OFDM, filter bank multicarrier (FBMC), and the like.

As shown in FIG. 1A, the communications system 100 may include wireless transmit/receive units (WTRUs) 102*a*, 102*b*, 102*c*, 102*d*, a radio access network (RAN) 104, a core network (CN) 106, a public switched telephone network (PSTN) 108, the Internet 110, and other networks 112, though it will be appreciated that the disclosed embodiments contemplate any number of WTRUs, base stations, networks, and/or network elements. Each of the WTRUs 102*a*, 102*b*, 102*c*, 102*d* may be any type of device configured to operate and/or communicate in a wireless environment. By way of example, the WTRUs 102*a*, 102*b*, 102*c*, 102*d*, any of which may be referred to as a station (STA), may be configured to transmit and/or receive wireless signals and may include a user equipment (UE), a mobile station, a fixed or mobile subscriber unit, a subscription-based unit, a pager, a cellular telephone, a personal digital assistant (PDA), a smartphone, a laptop, a netbook, a personal computer, a wireless sensor, a hotspot or Mi-Fi device, an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. Any of the WTRUs 102*a*, 102*b*, 102*c* and 102*d* may be interchangeably referred to as a UE.

The communications systems 100 may also include a base station 114*a* and/or a base station 114*b*. Each of the base stations 114*a*, 114*b* may be any type of device configured to wirelessly interface with at least one of the WTRUs 102*a*, 102*b*, 102*c*, 102*d* to facilitate access to one or more communication networks, such as the CN 106, the Internet 110, and/or the other networks 112. By way of example, the base stations 114*a*, 114*b* may be a base transceiver station (BTS), a NodeB, an eNode B (eNB), a Home Node B, a Home eNode B, a next generation NodeB, such as a gNode B (gNB), a new radio (NR) NodeB, a site controller, an access point (AP), a wireless router, and the like. While the base stations 114*a*, 114*b* are each depicted as a single element, it will be appreciated that the base stations 114*a*, 114*b* may include any number of interconnected base stations and/or network elements.

The base station 114*a* may be part of the RAN 104, which may also include other base stations and/or network elements (not shown), such as a base station controller (BSC), a radio network controller (RNC), relay nodes, and the like. The base station 114*a* and/or the base station 114*b* may be configured to transmit and/or receive wireless signals on one or more carrier frequencies, which may be referred to as a cell (not shown). These frequencies may be in licensed spectrum, unlicensed spectrum, or a combination of licensed and unlicensed spectrum. A cell may provide coverage for a wireless service to a specific geographical area that may be relatively fixed or that may change over time. The cell may further be divided into cell sectors. For example, the cell associated with the base station 114*a* may be divided into three sectors. Thus, in one embodiment, the base station 114*a* may include three transceivers, i.e., one for each sector of the cell. In an embodiment, the base station 114*a* may employ multiple-input multiple output (MIMO) technology and may utilize multiple transceivers for each sector of the cell. For example, beamforming may be used to transmit and/or receive signals in desired spatial directions.

The base stations 114*a*, 114*b* may communicate with one or more of the WTRUs 102*a*, 102*b*, 102*c*, 102*d* over an air interface 116, which may be any suitable wireless communication link (e.g., radio frequency (RF), microwave, centimeter wave, micrometer wave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114*a* in the RAN 104 and the WTRUs 102*a*, 102*b*, 102*c* may implement a radio technology such as Universal Mobile Telecommunications System (UMTS) Terrestrial Radio Access (UTRA), which may establish the air interface 116 using wideband CDMA (WCDMA). WCDMA may include communication protocols such as High-Speed Packet Access (HSPA) and/or Evolved HSPA (HSPA+). HSPA may include High-Speed Downlink (DL) Packet Access (HSDPA) and/or High-Speed Uplink (UL) Packet Access (HSUPA).

In an embodiment, the base station 114*a* and the WTRUs 102*a*, 102*b*, 102*c* may implement a radio technology such as Evolved UMTS Terrestrial Radio Access (E-UTRA), which may establish the air interface 116 using Long Term Evolution (LTE) and/or LTE-Advanced (LTE-A) and/or LTE-Advanced Pro (LTE-A Pro).

In an embodiment, the base station 114*a* and the WTRUs 102*a*, 102*b*, 102*c* may implement a radio technology such as NR Radio Access, which may establish the air interface 116 using NR.

In an embodiment, the base station 114*a* and the WTRUs 102*a*, 102*b*, 102*c* may implement multiple radio access technologies. For example, the base station 114*a* and the WTRUs 102*a*, 102*b*, 102*c* may implement LTE radio access and NR radio access together, for instance using dual connectivity (DC) principles. Thus, the air interface utilized by WTRUs 102*a*, 102*b*, 102*c* may be characterized by multiple types of radio access technologies and/or transmissions sent to/from multiple types of base stations (e.g., an eNB and a gNB).

In other embodiments, the base station 114*a* and the WTRUs 102*a*, 102*b*, 102*c* may implement radio technologies such as IEEE 802.11 (i.e., Wireless Fidelity (WiFi), IEEE 802.16 (i.e., Worldwide Interoperability for Microwave Access (WiMAX)), CDMA2000, CDMA2000 1×, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114*b* in FIG. 1A may be a wireless router, Home Node B, Home eNode B, or access point, for example, and may utilize any suitable RAT for facilitating wireless connectivity in a localized area, such as a place of business, a home, a vehicle, a campus, an industrial facility, an air corridor (e.g., for use by drones), a roadway, and the like. In one embodiment, the base station 114*b* and the WTRUs 102*c*, 102*d* may implement a radio technology such as IEEE 802.11 to establish a wireless local area network (WLAN). In an embodiment, the base station 114*b* and the WTRUs 102*c*, 102*d* may implement a radio technology such as IEEE 802.15 to establish a wireless personal area network (WPAN). In yet another embodiment, the base station 114*b* and the WTRUs 102*c*, 102*d* may utilize a cellular-based RAT (e.g., WCDMA, CDMA2000, GSM, LTE, LTE-A, LTE-A Pro, NR etc.) to establish a picocell or femtocell. As shown in FIG. 1A, the base station 114*b* may have a direct connection to the Internet 110. Thus, the base station 114*b* may not be required to access the Internet 110 via the CN 106.

The RAN 104 may be in communication with the CN 106, which may be any type of network configured to provide voice, data, applications, and/or voice over internet protocol (VoIP) services to one or more of the WTRUs 102*a*, 102*b*, 102*c*, 102*d*. The data may have varying quality of service (QoS) requirements, such as differing throughput requirements, latency requirements, error tolerance requirements, reliability requirements, data throughput requirements, mobility requirements, and the like. The CN 106 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104 and/or the CN 106 may be in direct or indirect communication with other RANs that employ the same RAT as the RAN 104 or a different RAT. For example, in addition to being connected to the RAN 104, which may be utilizing a NR radio technology, the CN 106 may also be in communication with another RAN (not shown) employing a GSM, UMTS, CDMA 2000, WiMAX, E-UTRA, or WiFi radio technology.

The CN 106 may also serve as a gateway for the WTRUs 102*a*, 102*b*, 102*c*, 102*d* to access the PSTN 108, the Internet 110, and/or the other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and/or the internet protocol (IP) in the TCP/IP internet protocol suite. The networks 112 may include wired and/or wireless communications networks owned and/or operated by other service providers. For example, the networks 112 may include another CN connected to one or more RANs, which may employ the same RAT as the RAN 104 or a different RAT.

Some or all of the WTRUs 102*a*, 102*b*, 102*c*, 102*d* in the communications system 100 may include multi-mode capabilities (e.g., the WTRUs 102*a*, 102*b*, 102*c*, 102*d* may include multiple transceivers for communicating with different wireless networks over different wireless links). For example, the WTRU 102*c* shown in FIG. 1A may be configured to communicate with the base station 114*a*, which may employ a cellular-based radio technology, and with the base station 114*b*, which may employ an IEEE 802 radio technology.

Figure 1B:
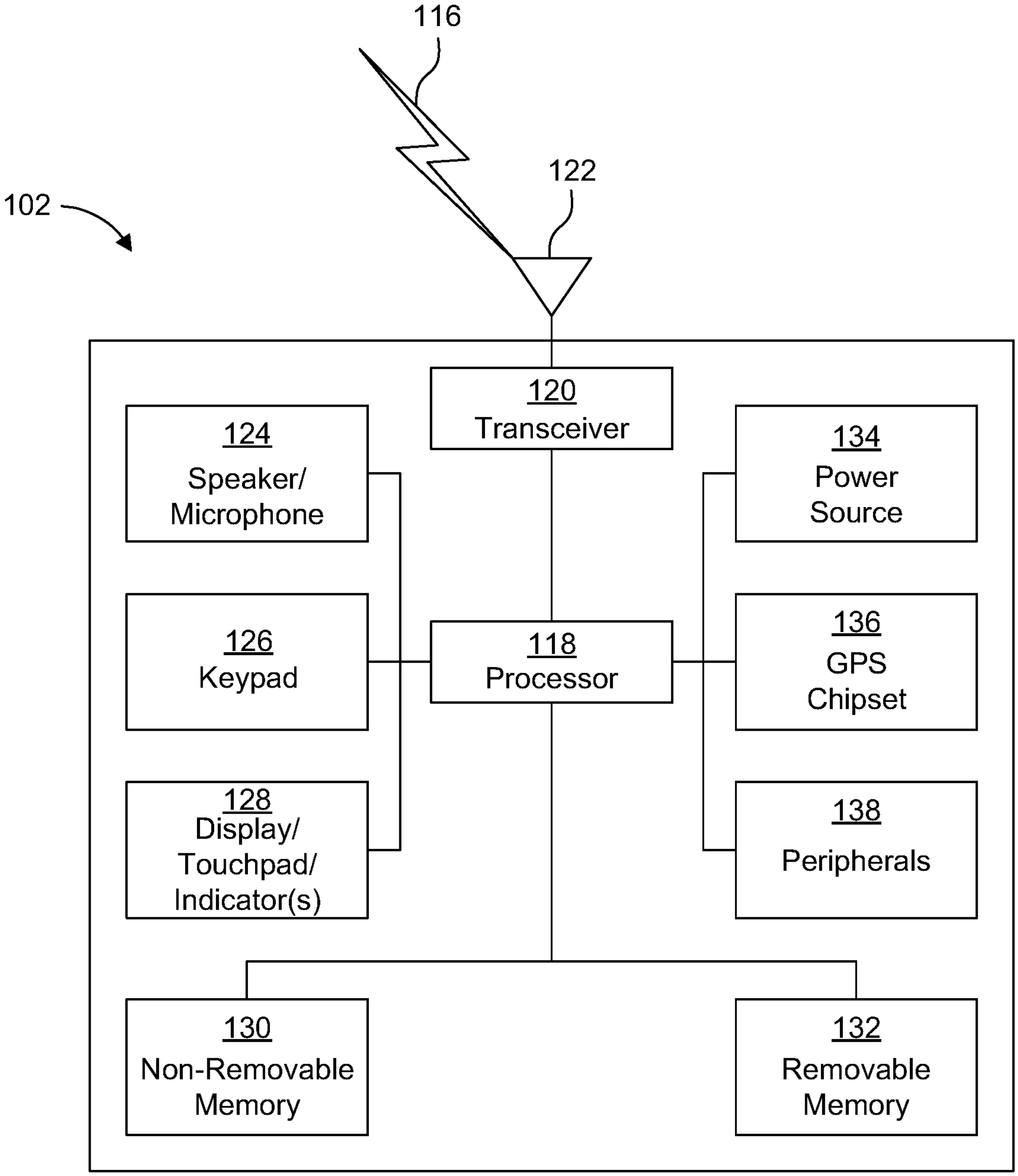
FIG. 1B is a system diagram illustrating an example wireless transmit/receive unit (WTRU) that may be used within the communications system illustrated in FIG. 1A according to an embodiment.

FIG. 1B is a system diagram illustrating an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and/or other peripherals 138, among others. It will be appreciated that the WTRU 102 may include any sub-combination of the foregoing elements while remaining consistent with an embodiment.

The processor 118 may be a general-purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs), any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114*a*) over the air interface 116. For example, in one embodiment, the transmit/receive element 122 may be an antenna configured to transmit and/or receive RF signals. In an embodiment, the transmit/receive element 122 may be an emitter/detector configured to transmit and/or receive IR, UV, or visible light signals, for example. In yet another embodiment, the transmit/receive element 122 may be configured to transmit and/or receive both RF and light signals. It will be appreciated that the transmit/receive element 122 may be configured to transmit and/or receive any combination of wireless signals.

Although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as NR and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114*a*, 114*b*) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs and/or video), a universal serial bus (USB) port, a vibration device, a television transceiver, a hands free headset, a Bluetooth® module, a frequency modulated (FM) radio unit, a digital music player, a media player, a video game player module, an Internet browser, a Virtual Reality and/or Augmented Reality (VR/AR) device, an activity tracker, and the like. The peripherals 138 may include one or more sensors. The sensors may be one or more of a gyroscope, an accelerometer, a hall effect sensor, a magnetometer, an orientation sensor, a proximity sensor, a temperature sensor, a time sensor; a geolocation sensor, an altimeter, a light sensor, a touch sensor, a magnetometer, a barometer, a gesture sensor, a biometric sensor, a humidity sensor and the like.

The WTRU 102 may include a full duplex radio for which transmission and reception of some or all of the signals (e.g., associated with particular subframes for both the UL (e.g., for transmission) and DL (e.g., for reception) may be concurrent and/or simultaneous. The full duplex radio may include an interference management unit to reduce and or substantially eliminate self-interference via either hardware (e.g., a choke) or signal processing via a processor (e.g., a separate processor (not shown) or via processor 118). In an embodiment, the WTRU 102 may include a half-duplex radio for which transmission and reception of some or all of the signals (e.g., associated with particular subframes for either the UL (e.g., for transmission) or the DL (e.g., for reception)).

Figure 1C:
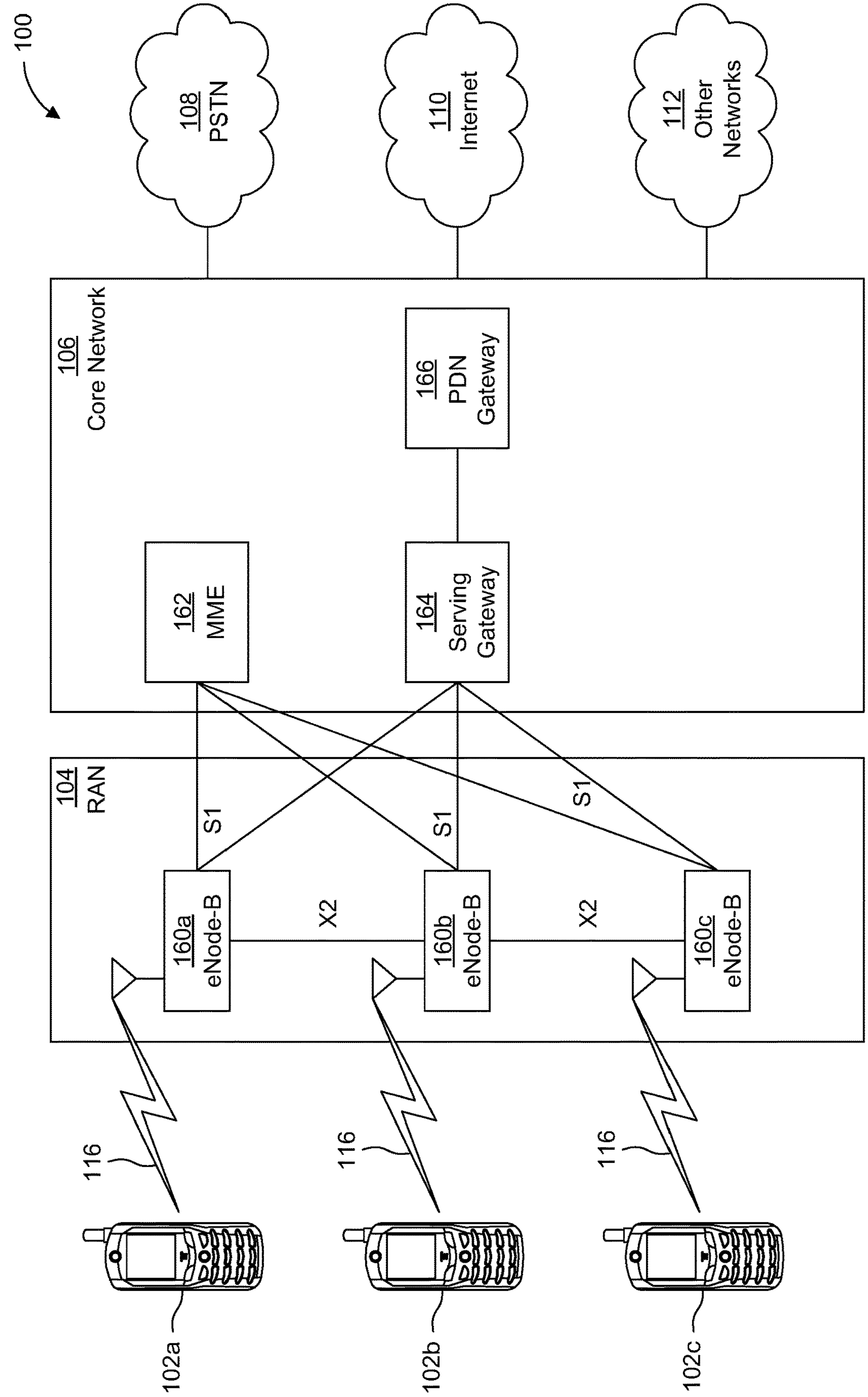
FIG. 1C is a system diagram illustrating an example radio access network (RAN) and an example core network (CN) that may be used within the communications system illustrated in FIG. 1A according to an embodiment.

FIG. 1C is a system diagram illustrating the RAN 104 and the CN 106 according to an embodiment. As noted above, the RAN 104 may employ an E-UTRA radio technology to communicate with the WTRUs 102*a*, 102*b*, 102*c* over the air interface 116. The RAN 104 may also be in communication with the CN 106.

The RAN 104 may include eNode-Bs 160*a*, 160*b*, 160*c*, though it will be appreciated that the RAN 104 may include any number of eNode-Bs while remaining consistent with an embodiment. The eNode-Bs 160*a*, 160*b*, 160*c* may each include one or more transceivers for communicating with the WTRUs 102*a*, 102*b*, 102*c* over the air interface 116. In one embodiment, the eNode-Bs 160*a*, 160*b*, 160*c* may implement MIMO technology. Thus, the eNode-B 160*a*, for example, may use multiple antennas to transmit wireless signals to, and/or receive wireless signals from, the WTRU 102*a*.

Each of the eNode-Bs 160*a*, 160*b*, 160*c* may be associated with a particular cell (not shown) and may be configured to handle radio resource management decisions, handover decisions, scheduling of users in the UL and/or DL, and the like. As shown in FIG. 1C, the eNode-Bs 160*a*, 160*b*, 160*c* may communicate with one another over an X2 interface.

The CN 106 shown in FIG. 1C may include a mobility management entity (MME) 162, a serving gateway (SGW) 164, and a packet data network (PDN) gateway (PGW) 166. While the foregoing elements are depicted as part of the CN 106, it will be appreciated that any of these elements may be owned and/or operated by an entity other than the CN operator.

The MME 162 may be connected to each of the eNode-Bs 162*a*, 162*b*, 162*c* in the RAN 104 via an S1 interface and may serve as a control node. For example, the MME 162 may be responsible for authenticating users of the WTRUs 102*a*, 102*b*, 102*c*, bearer activation/deactivation, selecting a particular serving gateway during an initial attach of the WTRUs 102*a*, 102*b*, 102*c*, and the like. The MME 162 may provide a control plane function for switching between the RAN 104 and other RANs (not shown) that employ other radio technologies, such as GSM and/or WCDMA.

The SGW 164 may be connected to each of the eNode Bs 160*a*, 160*b*, 160*c* in the RAN 104 via the S1 interface. The SGW 164 may generally route and forward user data packets to/from the WTRUs 102*a*, 102*b*, 102*c*. The SGW 164 may perform other functions, such as anchoring user planes during inter-eNode B handovers, triggering paging when DL data is available for the WTRUs 102*a*, 102*b*, 102*c*, managing and storing contexts of the WTRUs 102*a*, 102*b*, 102*c*, and the like.

The SGW 164 may be connected to the PGW 166, which may provide the WTRUs 102*a*, 102*b*, 102*c* with access to packet-switched networks, such as the Internet 110, to facilitate communications between the WTRUs 102*a*, 102*b*, 102*c* and IP-enabled devices.

The CN 106 may facilitate communications with other networks. For example, the CN 106 may provide the WTRUs 102*a*, 102*b*, 102*c* with access to circuit-switched networks, such as the PSTN 108, to facilitate communications between the WTRUs 102*a*, 102*b*, 102*c* and traditional land-line communications devices. For example, the CN 106 may include, or may communicate with, an IP gateway (e.g., an IP multimedia subsystem (IMS) server) that serves as an interface between the CN 106 and the PSTN 108. In addition, the CN 106 may provide the WTRUs 102*a*, 102*b*, 102*c* with access to the other networks 112, which may include other wired and/or wireless networks that are owned and/or operated by other service providers.

Although the WTRU is described in FIGS. 1A-1D as a wireless terminal, it is contemplated that in certain representative embodiments that such a terminal may use (e.g., temporarily or permanently) wired communication interfaces with the communication network.

In representative embodiments, the other network 112 may be a WLAN.

A WLAN in Infrastructure Basic Service Set (BSS) mode may have an Access Point (AP) for the BSS and one or more stations (STAs) associated with the AP. The AP may have access or an interface to a Distribution System (DS) or another type of wired/wireless network that carries traffic in to and/or out of the BSS. Traffic to STAs that originates from outside the BSS may arrive through the AP and may be delivered to the STAs. Traffic originating from STAs to destinations outside the BSS may be sent to the AP to be delivered to respective destinations. Traffic between STAs within the BSS may be sent through the AP, for example, where the source STA may send traffic to the AP and the AP may deliver the traffic to the destination STA. The traffic between STAs within a BSS may be considered and/or referred to as peer-to-peer traffic. The peer-to-peer traffic may be sent between (e.g., directly between) the source and destination STAs with a direct link setup (DLS). In certain representative embodiments, the DLS may use an 802.11e DLS or an 802.11z tunneled DLS (TDLS). A WLAN using an Independent BSS (IBSS) mode may not have an AP, and the STAs (e.g., all of the STAs) within or using the IBSS may communicate directly with each other. The IBSS mode of communication may sometimes be referred to herein as an "ad-hoc" mode of communication.

When using the 802.11 ac infrastructure mode of operation or a similar mode of operations, the AP may transmit a beacon on a fixed channel, such as a primary channel. The primary channel may be a fixed width (e.g., 20 MHz wide bandwidth) or a dynamically set width. The primary channel may be the operating channel of the BSS and may be used by the STAs to establish a connection with the AP. In certain representative embodiments, Carrier Sense Multiple Access with Collision Avoidance (CSMA/CA) may be implemented, for example in 802.11 systems. For CSMA/CA, the STAs (e.g., every STA), including the AP, may sense the primary channel. If the primary channel is sensed/detected and/or determined to be busy by a particular STA, the particular STA may back off. One STA (e.g., only one station) may transmit at any given time in a given BSS.

High Throughput (HT) STAs may use a 40 MHz wide channel for communication, for example, via a combination of the primary 20 MHz channel with an adjacent or nonadjacent 20 MHz channel to form a 40 MHz wide channel.

Very High Throughput (VHT) STAs may support 20 MHz, 40 MHz, 80 MHz, and/or 160 MHz wide channels. The 40 MHz, and/or 80 MHz, channels may be formed by combining contiguous 20 MHz channels. A 160 MHz channel may be formed by combining 8 contiguous 20 MHz channels, or by combining two non-contiguous 80 MHz channels, which may be referred to as an 80+80 configuration. For the 80+80 configuration, the data, after channel encoding, may be passed through a segment parser that may divide the data into two streams. Inverse Fast Fourier Transform (IFFT) processing, and time domain processing, may be done on each stream separately. The streams may be mapped on to the two 80 MHz channels, and the data may be transmitted by a transmitting STA. At the receiver of the receiving STA, the above described operation for the 80+80 configuration may be reversed, and the combined data may be sent to the Medium Access Control (MAC).

Sub 1 GHz modes of operation are supported by 802.11af and 802.11ah. The channel operating bandwidths, and carriers, are reduced in 802.11af and 802.11ah relative to those used in 802.11n, and 802.11ac. 802.11af supports 5 MHz, 10 MHz, and 20 MHz bandwidths in the TV White Space (TVWS) spectrum, and 802.11ah supports 1 MHz, 2 MHz, 4 MHz, 8 MHz, and 16 MHz bandwidths using non-TVWS spectrum. According to a representative embodiment, 802.11ah may support Meter Type Control/Machine-Type Communications (MTC), such as MTC devices in a macro coverage area. MTC devices may have certain capabilities, for example, limited capabilities including support for (e.g., only support for) certain and/or limited bandwidths. The MTC devices may include a battery with a battery life above a threshold (e.g., to maintain a very long battery life).

WLAN systems, which may support multiple channels, and channel bandwidths, such as 802.11n, 802.11ac, 802.11af, and 802.11ah, include a channel which may be designated as the primary channel. The primary channel may have a bandwidth equal to the largest common operating bandwidth supported by all STAs in the BSS. The bandwidth of the primary channel may be set and/or limited by a STA, from among all STAs in operating in a BSS, which supports the smallest bandwidth operating mode. In the example of 802.11ah, the primary channel may be 1 MHz wide for STAs (e.g., MTC type devices) that support (e.g., only support) a 1 MHz mode, even if the AP, and other STAs in the BSS support 2 MHz, 4 MHz, 8 MHz, 16 MHz, and/or other channel bandwidth operating modes. Carrier sensing and/or Network Allocation Vector (NAV) settings may depend on the status of the primary channel. If the primary channel is busy, for example, due to a STA (which supports only a 1 MHz operating mode) transmitting to the AP, all available frequency bands may be considered busy even though a majority of the available frequency bands remains idle.

In the United States, the available frequency bands, which may be used by 802.11 ah, are from 902 MHz to 928 MHz. In Korea, the available frequency bands are from 917.5 MHz to 923.5 MHz. In Japan, the available frequency bands are from 916.5 MHz to 927.5 MHz. The total bandwidth available for 802.11ah is 6 MHz to 26 MHz depending on the country code.

Figure 1D:
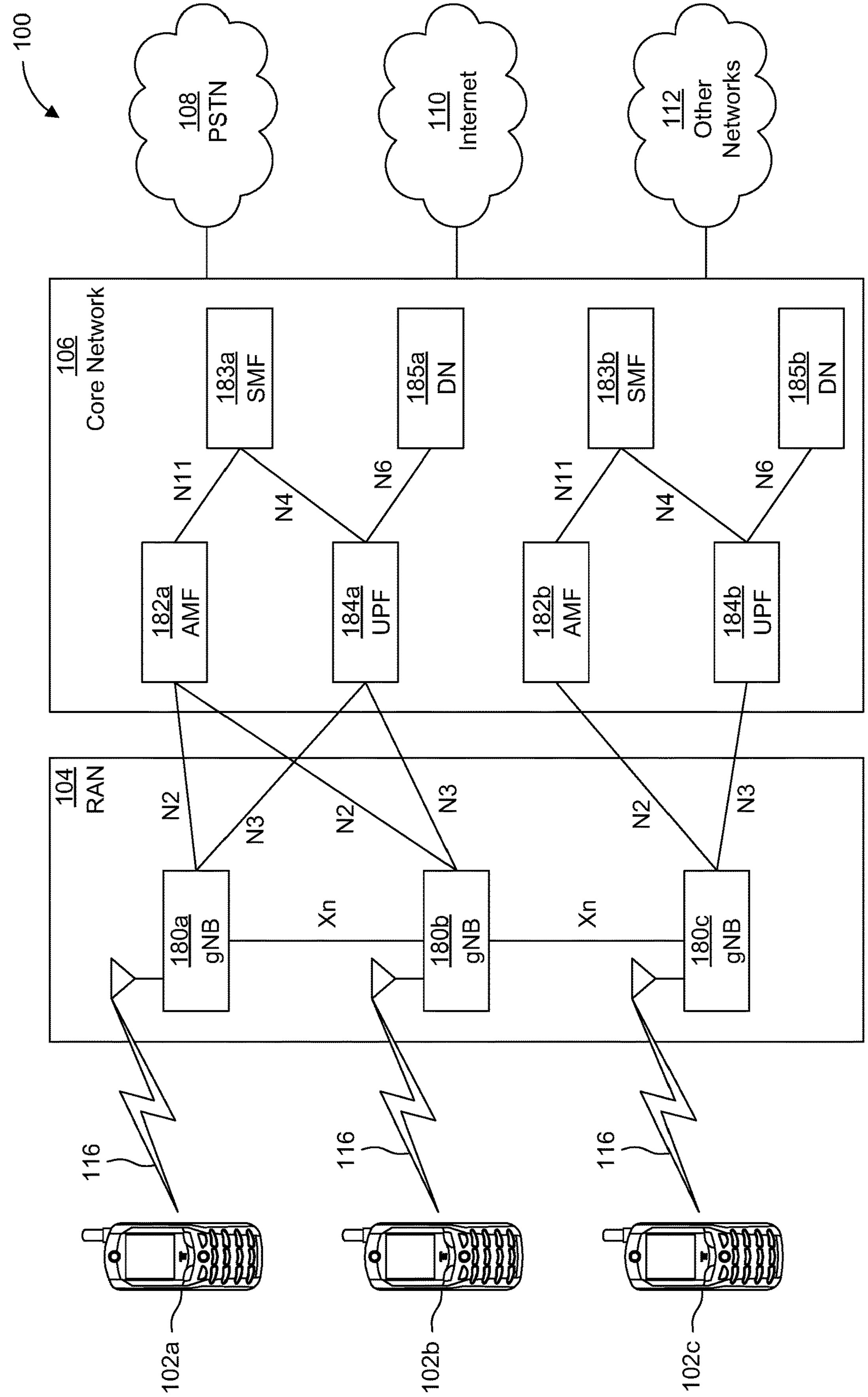
FIG. 1D is a system diagram illustrating a further example RAN and a further example CN that may be used within the communications system illustrated in FIG. 1A according to an embodiment.

FIG. 1D is a system diagram illustrating the RAN 104 and the CN 106 according to an embodiment. As noted above, the RAN 104 may employ an NR radio technology to communicate with the WTRUs 102*a*, 102*b*, 102*c* over the air interface 116. The RAN 104 may also be in communication with the CN 106.

The RAN 104 may include gNBs 180*a*, 180*b*, 180*c*, though it will be appreciated that the RAN 104 may include any number of gNBs while remaining consistent with an embodiment. The gNBs 180*a*, 180*b*, 180*c* may each include one or more transceivers for communicating with the WTRUs 102*a*, 102*b*, 102*c* over the air interface 116. In one embodiment, the gNBs 180*a*, 180*b*, 180*c* may implement MIMO technology. For example, gNBs 180*a*, 108*b* may utilize beamforming to transmit signals to and/or receive signals from the gNBs 180*a*, 180*b*, 180*c*. Thus, the gNB 180*a*, for example, may use multiple antennas to transmit wireless signals to, and/or receive wireless signals from, the WTRU 102*a*. In an embodiment, the gNBs 180*a*, 180*b*, 180*c* may implement carrier aggregation technology. For example, the gNB 180*a* may transmit multiple component carriers to the WTRU 102*a* (not shown). A subset of these component carriers may be on unlicensed spectrum while the remaining component carriers may be on licensed spectrum. In an embodiment, the gNBs 180*a*, 180*b*, 180*c* may implement Coordinated Multi-Point (CoMP) technology. For example, WTRU 102*a* may receive coordinated transmissions from gNB 180*a* and gNB 180*b* (and/or gNB 180*c*).

The WTRUs 102*a*, 102*b*, 102*c* may communicate with gNBs 180*a*, 180*b*, 180*c* using transmissions associated with a scalable numerology. For example, the OFDM symbol spacing and/or OFDM subcarrier spacing may vary for different transmissions, different cells, and/or different portions of the wireless transmission spectrum. The WTRUs 102*a*, 102*b*, 102*c* may communicate with gNBs 180*a*, 180*b*, 180*c* using subframe or transmission time intervals (TTIs) of various or scalable lengths (e.g., containing a varying number of OFDM symbols and/or lasting varying lengths of absolute time).

The gNBs 180*a*, 180*b*, 180*c* may be configured to communicate with the WTRUs 102*a*, 102*b*, 102*c* in a standalone configuration and/or a non-standalone configuration. In the standalone configuration, WTRUs 102*a*, 102*b*, 102*c* may communicate with gNBs 180*a*, 180*b*, 180*c* without also accessing other RANs (e.g., such as eNode-Bs 160*a*, 160*b*, 160*c*). In the standalone configuration, WTRUs 102*a*, 102*b*, 102*c* may utilize one or more of gNBs 180*a*, 180*b*, 180*c* as a mobility anchor point. In the standalone configuration, WTRUs 102*a*, 102*b*, 102*c* may communicate with gNBs 180*a*, 180*b*, 180*c* using signals in an unlicensed band. In a non-standalone configuration WTRUs 102*a*, 102*b*, 102*c* may communicate with/connect to gNBs 180*a*, 180*b*, 180*c* while also communicating with/connecting to another RAN such as eNode-Bs 160*a*, 160*b*, 160*c*. For example, WTRUs 102*a*, 102*b*, 102*c* may implement DC principles to communicate with one or more gNBs 180*a*, 180*b*, 180*c* and one or more eNode-Bs 160*a*, 160*b*, 160*c* substantially simultaneously. In the non-standalone configuration, eNode-Bs 160*a*, 160*b*, 160*c* may serve as a mobility anchor for WTRUs 102*a*, 102*b*, 102*c* and gNBs 180*a*, 180*b*, 180*c* may provide additional coverage and/or throughput for servicing WTRUs 102*a*, 102*b*, 102*c*.

Each of the gNBs 180*a*, 180*b*, 180*c* may be associated with a particular cell (not shown) and may be configured to handle radio resource management decisions, handover decisions, scheduling of users in the UL and/or DL, support of network slicing, DC, interworking between NR and E-UTRA, routing of user plane data towards User Plane Function (UPF) 184*a*, 184*b*, routing of control plane information towards Access and Mobility Management Function (AMF) 182*a*, 182*b* and the like. As shown in FIG. 1D, the gNBs 180*a*, 180*b*, 180*c* may communicate with one another over an Xn interface.

The CN 106 shown in FIG. 1D may include at least one AMF 182*a*, 182*b*, at least one UPF 184*a*,184*b*, at least one Session Management Function (SMF) 183*a*, 183*b*, and possibly a Data Network (DN) 185*a*, 185*b*. While the foregoing elements are depicted as part of the CN 106, it will be appreciated that any of these elements may be owned and/or operated by an entity other than the CN operator.

The AMF 182*a*, 182*b* may be connected to one or more of the gNBs 180*a*, 180*b*, 180*c* in the RAN 104 via an N2 interface and may serve as a control node. For example, the AMF 182*a*, 182*b* may be responsible for authenticating users of the WTRUs 102*a*, 102*b*, 102*c*, support for network slicing (e.g., handling of different protocol data unit (PDU) sessions with different requirements), selecting a particular SMF 183*a*, 183*b*, management of the registration area, termination of non-access stratum (NAS) signaling, mobility management, and the like. Network slicing may be used by the AMF 182*a*, 182*b* in order to customize CN support for WTRUs 102*a*, 102*b*, 102*c* based on the types of services being utilized WTRUs 102*a*, 102*b*, 102*c*. For example, different network slices may be established for different use cases such as services relying on ultra-reliable low latency (URLLC) access, services relying on enhanced massive mobile broadband (eMBB) access, services for MTC access, and the like. The AMF 182*a*, 182*b* may provide a control plane function for switching between the RAN 104 and other RANs (not shown) that employ other radio technologies, such as LTE, LTE-A, LTE-A Pro, and/or non-3GPP access technologies such as WiFi.

The SMF 183*a*, 183*b* may be connected to an AMF 182*a*, 182*b* in the CN 106 via an N11 interface. The SMF 183*a*, 183*b* may also be connected to a UPF 184*a*, 184*b* in the CN 106 via an N4 interface. The SMF 183*a*, 183*b* may select and control the UPF 184*a*, 184*b* and configure the routing of traffic through the UPF 184*a*, 184*b*. The SMF 183*a*, 183*b* may perform other functions, such as managing and allocating UE IP address, managing PDU sessions, controlling policy enforcement and QoS, providing DL data notifications, and the like. A PDU session type may be IP-based, non-IP based, Ethernet-based, and the like.

The UPF 184*a*, 184*b* may be connected to one or more of the gNBs 180*a*, 180*b*, 180*c* in the RAN 104 via an N3 interface, which may provide the WTRUs 102*a*, 102*b*, 102*c* with access to packet-switched networks, such as the Internet 110, to facilitate communications between the WTRUs 102*a*, 102*b*, 102*c* and IP-enabled devices. The UPF 184, 184*b* may perform other functions, such as routing and forwarding packets, enforcing user plane policies, supporting multi-homed PDU sessions, handling user plane QoS, buffering DL packets, providing mobility anchoring, and the like.

The CN 106 may facilitate communications with other networks. For example, the CN 106 may include, or may communicate with, an IP gateway (e.g., an IP multimedia subsystem (IMS) server) that serves as an interface between the CN 106 and the PSTN 108. In addition, the CN 106 may provide the WTRUs 102*a*, 102*b*, 102*c* with access to the other networks 112, which may include other wired and/or wireless networks that are owned and/or operated by other service providers. In one embodiment, the WTRUs 102*a*, 102*b*, 102*c* may be connected to a local DN 185*a*, 185*b* through the UPF 184*a*, 184*b* via the N3 interface to the UPF 184*a*, 184*b* and an N6 interface between the UPF 184*a*, 184*b* and the DN 185*a*, 185*b*.

In view of FIGS. 1A-1D, and the corresponding description of FIGS. 1A-1D, one or more, or all, of the functions described herein with regard to one or more of: WTRU 102*a-d*, Base Station 114*a-b*, eNode-B 160*a-c*, MME 162, SGW 164, PGW 166, gNB 180*a-c*, AMF 182*a-b*, UPF 184*a-b*, SMF 183*a-b*, DN 185*a-b*, and/or any other device (s) described herein, may be performed by one or more emulation devices (not shown). The emulation devices may be one or more devices configured to emulate one or more, or all, of the functions described herein. For example, the emulation devices may be used to test other devices and/or to simulate network and/or WTRU functions.

The emulation devices may be designed to implement one or more tests of other devices in a lab environment and/or in an operator network environment. For example, the one or more emulation devices may perform the one or more, or all, functions while being fully or partially implemented and/or deployed as part of a wired and/or wireless communication network in order to test other devices within the communication network. The one or more emulation devices may perform the one or more, or all, functions while being temporarily implemented/deployed as part of a wired and/or wireless communication network. The emulation device may be directly coupled to another device for purposes of testing and/or performing testing using over-the-air wireless communications.

The one or more emulation devices may perform the one or more, including all, functions while not being implemented/deployed as part of a wired and/or wireless communication network. For example, the emulation devices may be utilized in a testing scenario in a testing laboratory and/or a non-deployed (e.g., testing) wired and/or wireless communication network in order to implement testing of one or more components. The one or more emulation devices may be test equipment. Direct RF coupling and/or wireless communications via RF circuitry (e.g., which may include one or more antennas) may be used by the emulation devices to transmit and/or receive data.

In new radio (NR) unlicensed bands, the initial access and PRACH procedures need enhancements in the corresponding shared spectrum in beyond 52.6 GHz. The random-access occasion (RO) configuration is based on consecutive allocation of ROs within a RACH slot with no gap between them, as illustrated in FIG. 2.

Figure 2:
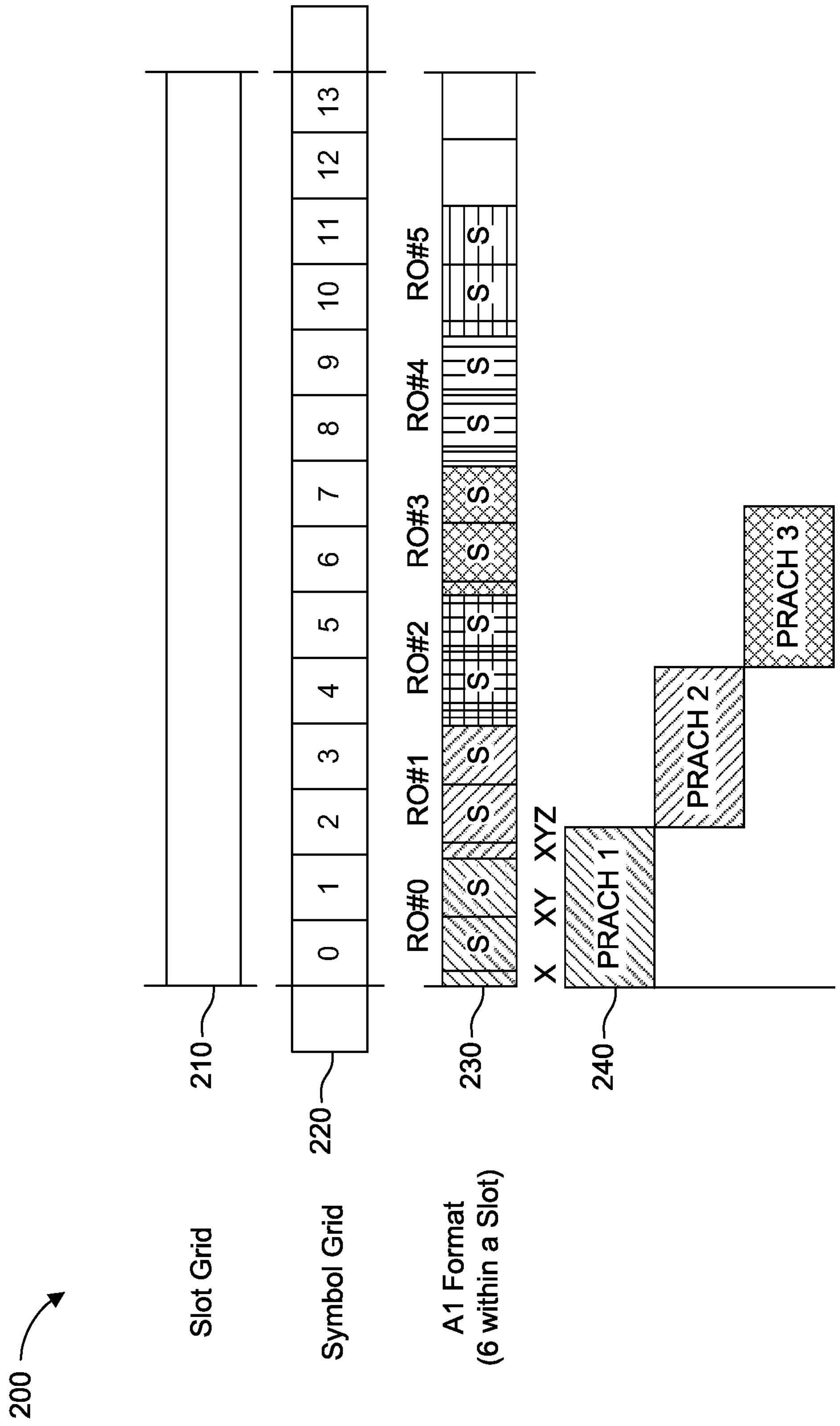
FIG. 2 illustrates an example of consecutive RO configurations in a RACH slot.

FIG. 2 illustrates an example 200 of consecutive RO configurations in a RACH slot. As illustrated in example 200, a slot grid 210 is provided. The slot grid 210 is divided into 14 symbol grids 220. The 14 symbol grids 220 are generally numbered from symbol 0 through symbol 13. The slot grid 210 includes an A1 format 230 with 6 ROs included in the slot. Format 230 includes ROs that are generally numbered from RO 0 through RO 5. Associated with each RO is a PRACH transmission 240. As illustrated, PRACH 1 corresponds with RO 0, PRACH 2 corresponds with RO 1, and PRACH 3 corresponds with RO 2.

On the other hand, in shared spectrum operation, the Listen Before Talk (LBT) is mandatory in many regions. As such, the Clear Channel Assessment (CCA) is performed before every single transmission using energy sensing. A WTRU may use Type 1 channel access procedure with p=1 for PRACH transmissions. However, the consecutive ROs may result in LBT failure at the succeeding ROs due to the PRACH transmission in the previous ROs, as shown in FIG. 3.

Figure 3:
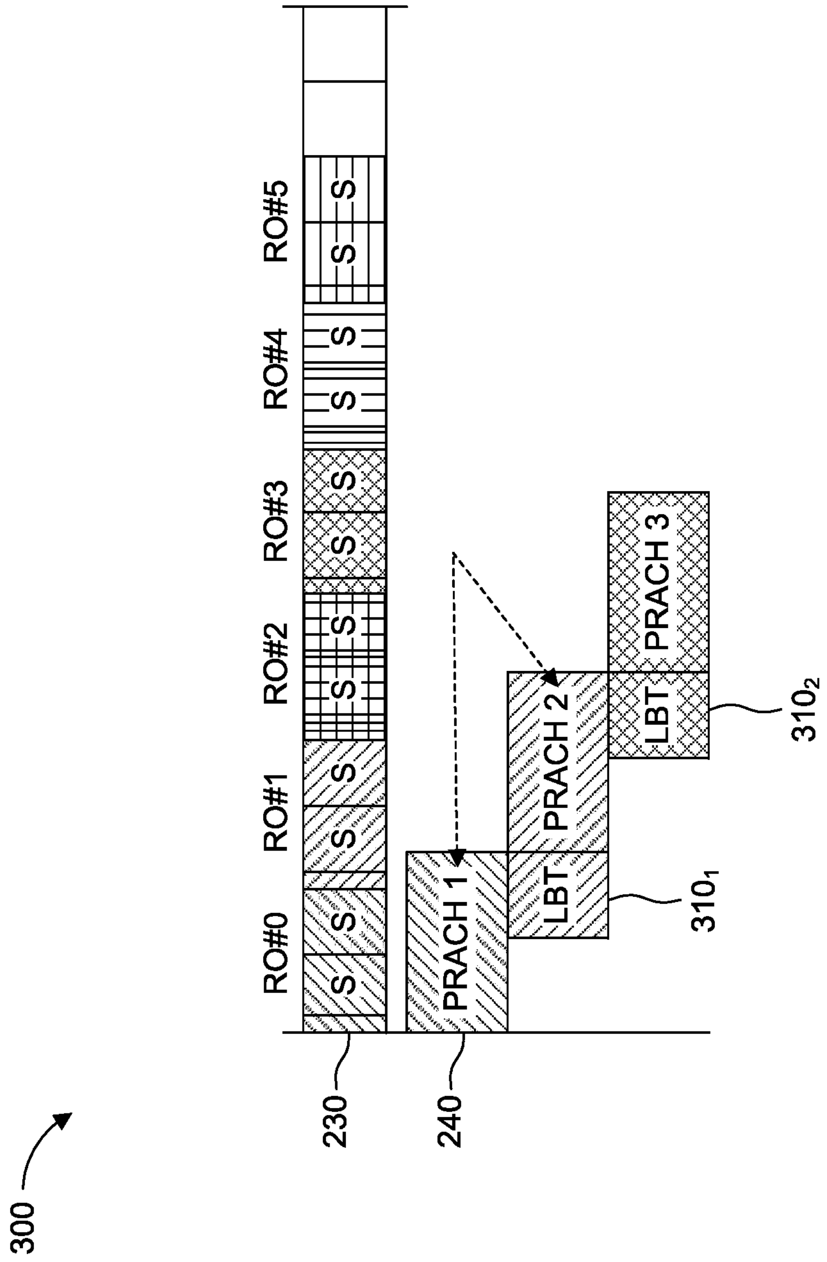
FIG. 3 illustrates PRACH transmission in consecutive ROs.

FIG. 3 illustrates PRACH transmission in consecutive ROs. Similar to that described with respect to FIG. 2, an A1 format with 6 ROs is included in the slot. Format 230 includes ROs that are generally numbered from RO 0 through RO 5. Associated with each RO is a PRACH transmission 240. As illustrated PRACH 1 corresponds with RO 0, PRACH 2 corresponds with RO 1, and PRACH 3 corresponds with RO 2. A WTRU may not transmit PRACH due to the LBT failure due to PRACH transmission from another WTRU. A WTRU that transmits PRACH in RO 0 may prevent another WTRU from transmitting in RO 1 as a result the LBT failure. If an LBT in a previous RO, i.e., RO 0, fails, the second WTRU may attempt recover a cover-code. If the recovery of the cover-code is successful, the second WTRU may continue with PRACH transmission in RO 1. In this scenario, the second WTRU may effectively skip or ignore the LBT results.

As explained in further detail herein, a methodology for accounting for the LBT in RO configurations is described. The methodology is based on extending the channel occupancy time (COT) through the RACH slot so that the WTRUs transmit PRACH without a need to perform the LBT.

In accounting for LBT in RO configuration, enhancements on the PRACH transmission in consecutive Random-Access Occasions (RO) for the NR-U with LBT operation are described. The extending and sharing of the Channel Occupancy Time (COT) based on blind detection of the WTRU and the indication of the gNB is described.

In several examples described herein, extending the COT for LBT-free PRACH transmission across consecutive ROs based on blind detection of a WTRU may occur. A WTRU may receive a configuration of PRACH information for blind detection. If the WTRU intends to transmit PRACH, the WTRU determines the mode of operation prior to PRACH transmission. Upon successful LBT, the WTRU transmits PRACH preamble scrambled with a cover-code, i.e., another Zadoff-Chu (ZC) sequence by using reserved root and cyclic shift, within a RACH slot, as is illustrated and described with respect to FIGS. 4-7. Upon LBT failure, based on the configured PRACH information for blind detection, the WTRU may attempt to detect if the channel is occupied due to the PRACH or other signals by performing the "sequence match" with the cover code using equation Eq. 1:

$$x_C(n)^H \times x_{u,C}(n) = x_C(n)^H \times (x_C(n) + x_u(n)) = |x_C(n)|^2 + 0 \quad \text{Equation 1}$$

Upon successful detection of the cover code, the WTRU may skip the LBT and may transmit PRACH. The WTRU optionally may select the preambles for the PRACH transmission from the subset of preambles that were not identified during the sequence-match procedure.

The COT for LBT-free PRACH transmission may be extended for one or more unused ROs across consecutive ROs. A WTRU may receive a configuration of PRACH information, a first cover code and a second cover code. The WTRU may receive a DCI-based signaling from a different frequency band as an indication for LBT-free PRACH transmission or LBT free COT extension. Upon reception of the triggering signaling and the LBT free PRACH transmission, the WTRU may transmit PRACH with a configured sequence scrambled by the first cover code, and may skip the LBT. Upon reception of the triggering signaling and the LBT free COT extension, the WTRU may transmit a PRACH only with the second cover code, and may skip the LBT.

A determination of the mode of operation based on the cover-codes may occur. A WTRU may receive a configuration of PRACH information for blind detection including a set of cover codes. If the WTRU wants to transmit PRACH, the WTRU may determine a mode of operation prior to PRACH transmission. Upon successful LBT, the WTRU may transmit PRACH preamble while each sequence within the PRACH transmission is scrambled with one of the cover-codes, for example the first sequence with the first cover-code and the second sequence with the second cover-code. Upon LBT failure, based on the configured PRACH information for blind detection, the WTRU may attempt to detect if the channel is occupied due to the PRACH or other signals by performing the "sequence match" with the set of the cover codes.

Upon successful detection of the cover code, the WTRU may skip the LBT and may determine one or more ROs to transmit the PRACH based on the configured PRACH information and the cover-code the WTRU has recovered in the previous RO. The WTRU may transmit PRACH while scrambling the preamble with respective cover-codes from the set of cover-codes. The WTRU may select the respective cover-code for PRACH transmission based on the cover-codes recovered from the previous RO, a sequence that can go on cyclically.

A WTRU may transmit or receive a physical channel signal or reference signal according to at least one spatial domain filter. The term "beam" may be used to refer to a spatial domain filter. The WTRU may transmit a physical channel or signal using the same spatial domain filter as the spatial domain filter used for receiving an RS (such as CSI-RS) or a SS block. The WTRU transmission may be referred to as "target", and the received RS or SS block may be referred to as "reference" or "source". The WTRU may transmit the target physical channel signal or reference signal according to a spatial relation with a reference to such RS or SS block.

The WTRU may transmit a first physical channel signal or reference signal according to the same spatial domain filter as the spatial domain filter used for transmitting a second physical channel or signal. The first and second transmissions may be referred to as "target" and "reference" (or "source"), respectively. The WTRU may transmit the first (target) physical channel signal or reference signal according to a spatial relation with a reference to the second (reference) physical channel or signal.

A spatial relation may be implicit, configured by RRC or signaled by MAC CE or DCI. For example, a WTRU may transmit PUSCH and DM-RS of PUSCH according to the same spatial domain filter as an SRS indicated by an SRI indicated in DCI or configured by RRC. In another example, a spatial relation may be configured by RRC for an SRS resource indicator (SRI) or signaled by MAC CE for a PUCCH. Such spatial relation may also be referred to as a "beam indication".

The WTRU may receive a first (target) downlink channel signal according to the same spatial domain filter or spatial reception parameter as a second (reference) downlink channel signal. For example, such association may exist between a physical channel such as PDCCH or PDSCH and its respective DM-RS. At least when the first and second signals are reference signals, such association may exist when the WTRU is configured with a quasi-colocation (QCL) assumption type D between corresponding antenna ports. Such association may be configured as a transmission configuration indicator (TCI) state. A WTRU may be indicated with an association between a CSI-RS or SS block and a DM-RS by an index to a set of TCI states configured by RRC and/or signaled by MAC CE. Such indication may also be referred to as a "beam indication".

The Channel Occupancy Time (COT) for LBT-Free PRACH Transmission may be extended based on blind detection of a WTRU, based on dynamic indication from gNB, using a determination of the mode of operation based on the cover-codes, and with support of the PRACH transmission from a WTRU in multiple consecutive ROs.

The PRACH occasions for operation without beam switching gaps may be decomposed between consecutive ROs. The WTRU may re-allocate original ROs by halving the frequency resources into two consecutive ROs in time domain denoted as RO-pairs. The WTRU may expect the switching of the antennas corresponding to the ROs mapped to the first RO within a RO-pair (first half of the original RO) to take place during the second RO within the RO-pair (second half of the original ROs) without switching gaps.

Operation with or without shared spectrum channel access can be interchangeably used with unlicensed or licensed bands, respectively. The term unlicensed spectrum may be used to refer to license exempt spectrum and lightly licensed spectrum. The terms CORESET #0, Type0-PDCCH, and/or SIB1 may be used interchangeably but still consistent herein. Random access (RA) operation, random access occasion (RO), preamble transmission, PRACH occasion, or PRACH transmission occasion may be used interchangeably but still consistent herein.

The COT for LBT-free PRACH transmission may be extended based on blind detection of a WTRU. The extension may use a random-access procedure in the NR shared spectrum. A WTRU may perform the random-access (RA) procedure to access a cell. The random-access procedure may be initiated upon a request of a Physical Random-Access Channel (PRACH) transmission by higher layers or a PDCCH order. The PRACH configuration may include one or more of preamble index, preamble SCS, PRACH format, corresponding RA-RNTI, and PRACH time and frequency allocation resources.

A WTRU may be provided with the number N of SS/PBCH block indexes that are associated with one RACH Occasion (RO) by parameter ssb-perRACH-OccasionAndCB-PreamblesPerSSB. For a PRACH transmission, a PRACH mask index is indicated to the WTRU which implies the ROs for the PRACH transmission, wherein the ROs are associated with the SS/PBCH block index selected by the WTRU.

The ROs may be mapped consecutively per respective SS/PBCH block index and the WTRU may select the ROs for the PRACH transmission based on the PRACH mask index associated with the chosen SS/PBCH block index in the first available mapping cycle.

The extension may use a PRACH. The basic random-access preambles are Zadoff-Chu (ZC) sequences generated based on a given root sequence and a given cyclic shift. The WTRU may determine the logical root sequence index obtained from the higher-layer parameter prach-RootSequenceIndex or rootSequenceIndex-BFR, or by msgA-PRACH-RootSequenceIndex. The WTRU may determine the cyclic shift based on the zeroCorrelationZoneConfig index along with the preamble's code-length. As per time-frequency RO, the WTRU may select from 64 preamble sequences generated first by increasing order of cyclic shift from the given logical root sequence, and then by increasing order of the given logical root sequence index.

The main properties of the ZC codes used to generate the random-access preambles may be the normalized cross-correlation between two ZC sequences generated from two different root sequences is as low as one over the preamble's code length. The cross correlation between the cyclic shifts of a ZC sequence is zero, i.e., they are orthogonal to each other.

Random access preambles are transmitted within the frequency resources specified by higher layer parameters msg1-FrequencyStart or msgA-RO-FrequencyStart, if configured. The time resource allocations are determined based on the PRACH configuration index, which is given by the higher-layer parameter prach-ConfigurationIndex, or by msgA-PRACH-ConfigurationIndex if configured. The PRACH preamble formats are provided including the length of Cyclic Prefix (CP), the number of sequences, and the guard time (if any).

The extension may use channel access for shared spectrum. The channel access in shared spectrum includes the procedures to evaluate the channel's availability and the Clear Channel Assessment (CCA) before transmission. The energy detection is accomplished as part of Listen-Before-Talk (LBT) procedure and before the channel access. The defer duration $T_d$ consists of duration $T_f$=16 us immediately followed by $m_p$ consecutive slot durations where each slot duration is $T_{sl}$=9 us, and $T_f$ includes an idle slot duration $T_{sl}$ at start of $T_f$. Thus, the minimum length for LBT is 25 us.

Upon successful evaluation on channel's availability, the channel occupancy takes effect by transmission on the channel. The Channel Occupancy Time (COT) refers to the total time the transmissions on the channel are performed that can be shared between a gNB and the corresponding WTRUs. Within a COT, the gaps less than or equal to 25 us are counted in the channel occupancy time, whereas separate LBT may be required if the gaps are greater than 16 us.

As for the PRACH transmission in shared spectrum, a WTRU may use Type 1 channel access procedure with priority class p=1. In other words, WTRUs may be required to accomplish LBT procedure before initiating the corresponding PRACH transmissions. The extending the COT for LBT-Free PRACH transmission may be based on blind detection of a WTRU. A WTRU may be configured with PRACH resources including one or more of the preamble root sequence indices, preamble cyclic shift, preamble SCS, corresponding RA-RNTI, PRACH time and frequency resources. The WTRU may use the preamble root sequence index and preamble cyclic shift parameters to generate a pool of preamble sequences that includes up to 64 sequences. The WTRU may select a preamble sequence randomly from the set of the sequences to be used during PRACH transmission in the corresponding RACH Occasions (RO). The parameters to generate the preambles may be determined for contention-based or contention-free RACH. The pool of preamble sequences may be cell-specific and common for all WTRUs that may further cause contentions as the different WTRUs may select the same preamble, denoted as contention-based RACH. The preamble sequences may be WTRU-specific indicated through RRC or DCI-based signaling that implies the contention-free RACH. The term RACH/PRACH may be used interchangeably to refer to contention-based RACH/PRACH and contention-free RACH/PRACH but still consistent herein.

In an example for the shared spectrum channel access, a WTRU may be configured with one or more of the Zadoff-Chu sequences as PRACH cover codes. The PRACH cover codes may have the same length as the preamble sequences. The WTRU may scramble the PRACH cover codes with the respective preamble code. The WTRU may not select the respective preamble sequence from one of the codes configured as the PRACH cover code. If the randomly selected preamble sequence for the PRACH transmission is the same as one of the sequences that are configured as the PRACH cover code, the WTRU may skip the preamble and go on with another random draw from the pool of preamble sequences. The WTRU may use the PRACH cover codes to implicitly send an indication to declare that a PRACH transmission is ongoing. The WTRU may send the indication to declare that a COT is reserved for the PRACH transmission, and that the reserved COT can be shared and extended by other WTRUs that may want to transmit PRACH while skipping the LBT, i.e., LBT-free PRACH transmission.

In an example, the WTRU may be configured with the PRACH cover codes based on one or more of the following where the WTRU may determine the number of PRACH cover codes based on the preamble's format, preamble's SCS, and the number of time-domain PRACH occasions within a PRACH slot. The WTRU may explicitly determine the PRACH cover codes. The PRACH cover codes may be preconfigured. In an example, for a PRACH scenario with four PRACH cover codes, the first four preamble sequences from the pool of sequences could be considered as the PRACH cover codes. The PRACH cover codes defined in each time-frequency PRACH occasion, may be enumerated in increasing order of first increasing cyclic shift of a logical root sequence, and then in increasing order of the logical root sequence index, starting with the index obtained from the higher-layer parameter.

In another example, the PRACH cover codes may be different from the sequences that are included in the pool of the preamble sequences. For instance, in a PRACH scenario with four PRACH cover codes, the first four sequences following the last, i.e., 64th, preamble sequence may be configured as the PRACH cover codes. It is as if there were four additional sequences generated at the end of the pool of the preamble sequences to be used as the PRACH cover codes. The additional PRACH cover codes may be generated in increasing order of the cyclic shift of the logical root sequence used to generate the last, i.e., 64th, preamble sequence, and then, if required, in increasing order of the logical root sequence index.

In another example, to avoid the conflict of the cover codes in between the cells, the PRACH cover codes may be determined based on a preconfigured arrangement. The cover codes may be selected based on the Physical Cell ID (PCID) or a modulus function of the PCID, or the cover codes may be selected based on the order of the sequences in the pool of sequences, such as odd sequences, even sequences, or based on the sequences with a specific modulus function result. The PRACH cover codes may be determined based on an RRC signaling. The PRACH cover codes may be determined based on a DCI signaling. The PRACH cover codes may be determined as part of the initial access signaling through the MIB or SIB1.

In an example, the WTRU may select a preamble to perform the PRACH transmission, and may perform Listen-Before-Talk (LBT) to assure a Clear Channel Assessment (CCA) before PRACH transmission. For LBT with p=1, the minimum length for LBT is 25 us which translates into a minimum of 3, 13, and 25 symbols in the SCS of 120 kHz, 480 kHz, and 960 kHz, respectively. The WTRU may initiate the LBT procedure earlier than the RACH slot and the corresponding RO. The LBT may start from multiple symbols, ROs, or slots in advance, depending on the preamble SCS, the preamble format and the number of time-domain PRACH occasions within a PRACH slot. In an example, for PRACH with 960 kHz SCS and the PRACH A1 format, the number of sequences within each RO is two, and the number of time-domain PRACH occasions within a PRACH slot is six. The WTRU that wishes to transmit in one or more of the ROs within the RACH slot may initiate the LBT at least 25 symbols in advance which implies one or two slots before the RACH slot.

In an example, the WTRU may perform PRACH transmission in the corresponding RO within the RACH slot upon successful LBT. The WTRU may use the PRACH cover code to scramble with the respective selected preamble sequence. The WTRU may then send the scrambled preamble for the PRACH transmission.

Figure 4:
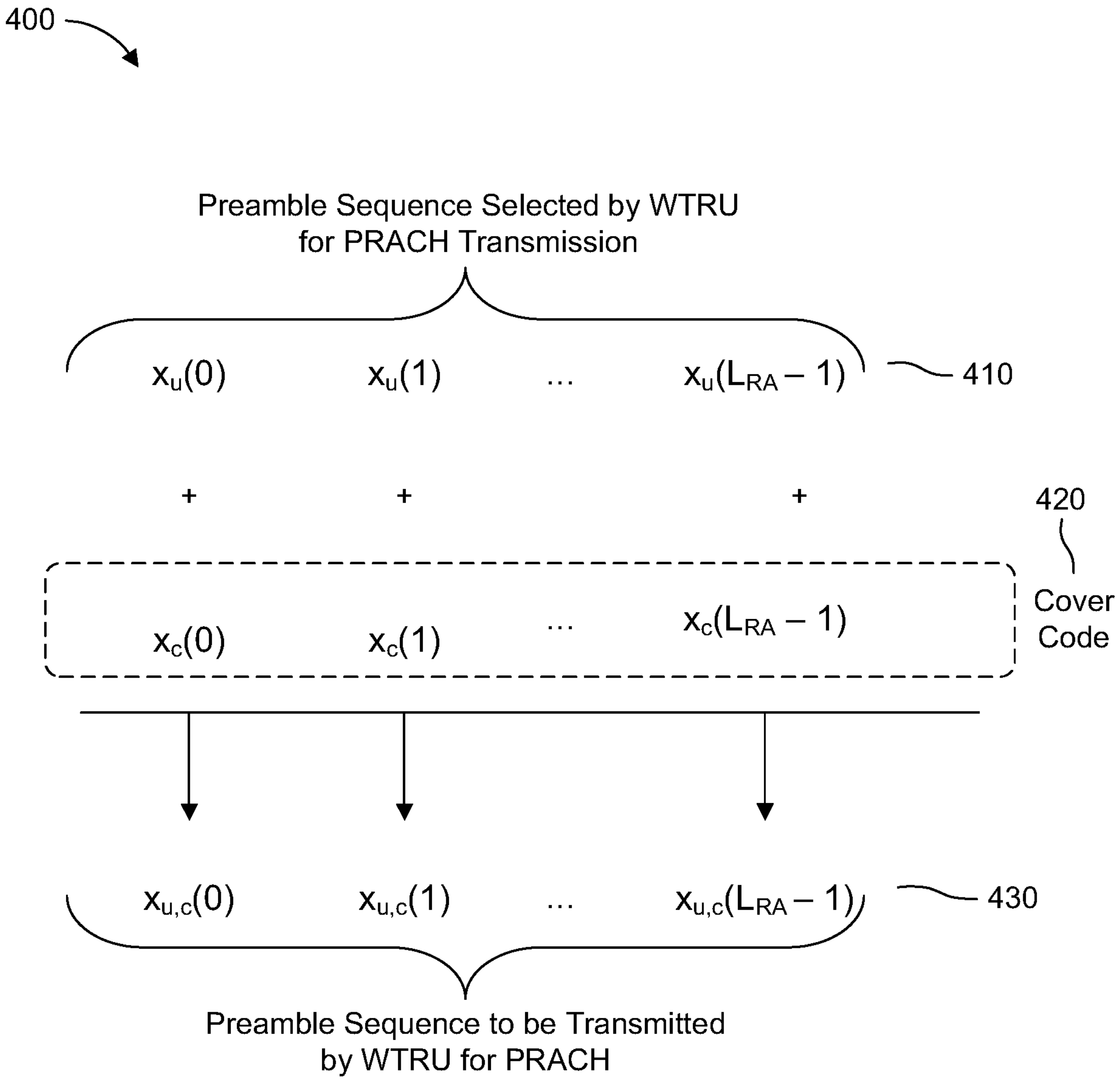
FIG. 4 illustrates a scrambling of the preamble sequence with the cover code.

FIG. 4 illustrates a scrambling of the preamble sequence with the cover code 400. In FIG. 4, the $x_u$, is the preamble sequence selected by WTRU that is scrambled by $x_C$, which is the PRACH cover code. The WTRU may send the scrambled preamble, i.e., $x_{u,C}$, as the Respective Preamble for the PRACH Transmission. The $L_{RA}$ is the length of the selected preamble which is the same for the PRACH cover code. The preamble sequence selected by the WTRU for PRACH transmission 410 is defined in Eq. 2:

$$X_u = \{x_u(0), x_u(1), \ldots, x_u(L_{RA}-1)\} \quad \text{Equation 2}$$

Added to the preamble sequence selected by the WTRU for PRACH transmission is the cover code 420. The cover code 420 may be as provided in Eq. 3:

$$X_C = \{x_C(0), x_C(1), \ldots, x_C(L_{RA}-1)\} \quad \text{Equation 3}$$

The result 430 is the preamble sequence to be transmitted by the WTRU for PRACH. The result 430 is provided in Eq. 4:

$$X_{uC} = \{x_{uC}(0), x_{uC}(1), \ldots, x_{uC}(L_{RA}-1)\} \quad \text{Equation 4}$$

Figure 5:
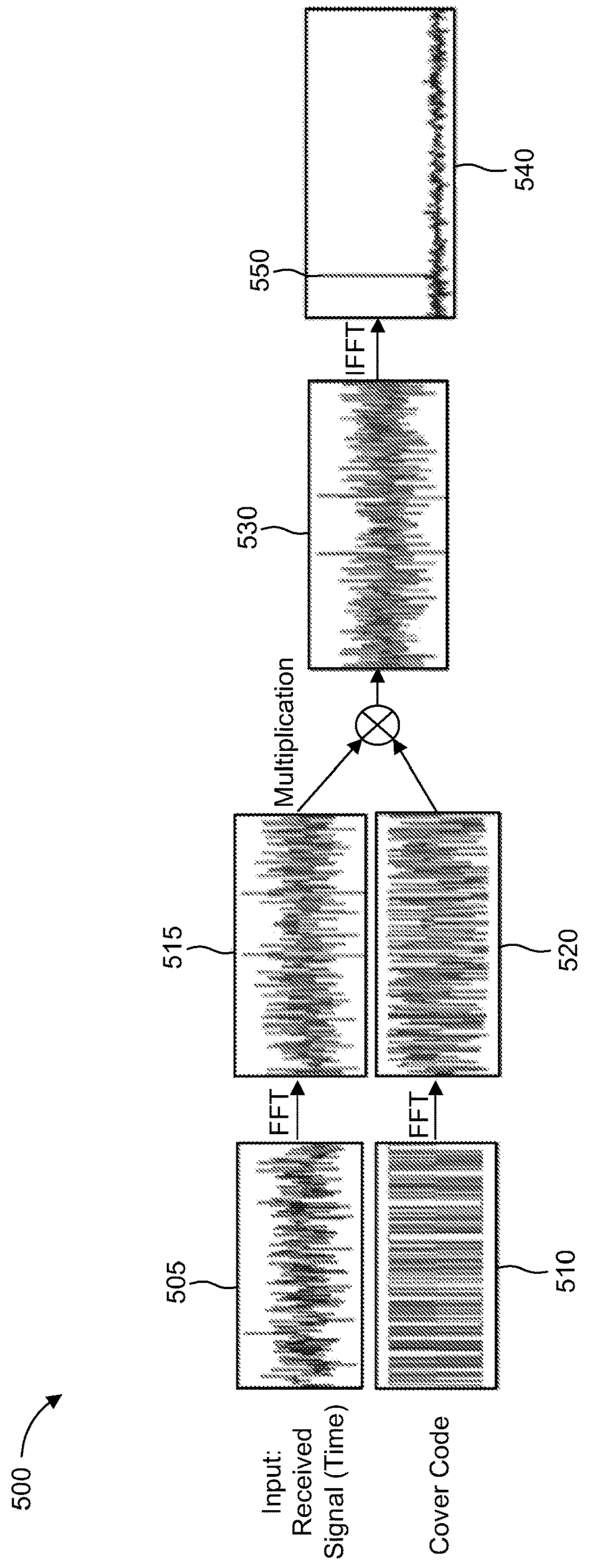
FIG. 5 illustrates the signal processing 500 in a graphical depiction.

In an example, if there is an LBT-failure, the WTRU may initiate a blind detection to determine if the LBT-failure is caused by a PRACH transmission during the previous RO within the RACH slot. The WTRU may buffer the signals within the previous ROs to perform the blind detection. The WTRU may use the configuration of the RACH slot, including the preamble SCS, the preamble format, and the time and frequency location of the RACH slot, to determine the buffer length. The WTRU may initiate the AGC convergence to get the baseband received signal to the desired level. The AGC deals with the aggregate of energy received, including the energy from all WTRUs that transmitted PRACH in the previous ROs. The WTRU may use the first preamble sequence to converge AGC and then continue with the next sequences for the blind detection. The WTRU may perform sequence matching on one or more of the PRACH cover-codes. The sequence matching may be performed through a cross-correlation function that may be accomplished by IFFT filters. FIG. 5 illustrates the signal processing 500 in a graphical depiction. The signal processing 500 includes an input of a received signal 505 in the time domain and the cover code 510 in the time domain. The received signal 505 has an FFT applied to received signal 505 to produce the corresponding received signal 515 in the frequency domain. The cover code 510 has an FFT applied to cover code 510 to produce the corresponding cover code signal 520 in the frequency domain. The corresponding received signal 515 is multiplied with the corresponding cover code signal 520 to produce signal 530. An inverse FFT is performed on signal 530 to produce the resultant signal 540, the output of the IFFT filter. The spike 550 in the resultant signal 540 denotes the existence of the "cover code", implying that the channel is reserved for the PRACH transmission and LBT could be skipped. In FIG. 5, the received signals 505 are multiplied by the respective PRACH cover code 510 (after converting each using the FFT) and then passed to the IFFT filter. Upon detection of a spike 550 at the output of the IFFT, the WTRU may evaluate the spike 550 to conclude that the respective "cover code" is detected.

Upon successful detection of the one or more of the PRACH cover codes, the WTRU may consider the former LBT-failure to be due to PRACH transmission in the previous ROs, implying that the COT is reserved for the PRACH transmission. The WTRU may extend the PRACH COT by skipping the LBT and going on with the PRACH transmission in the corresponding RO.

Figure 6:
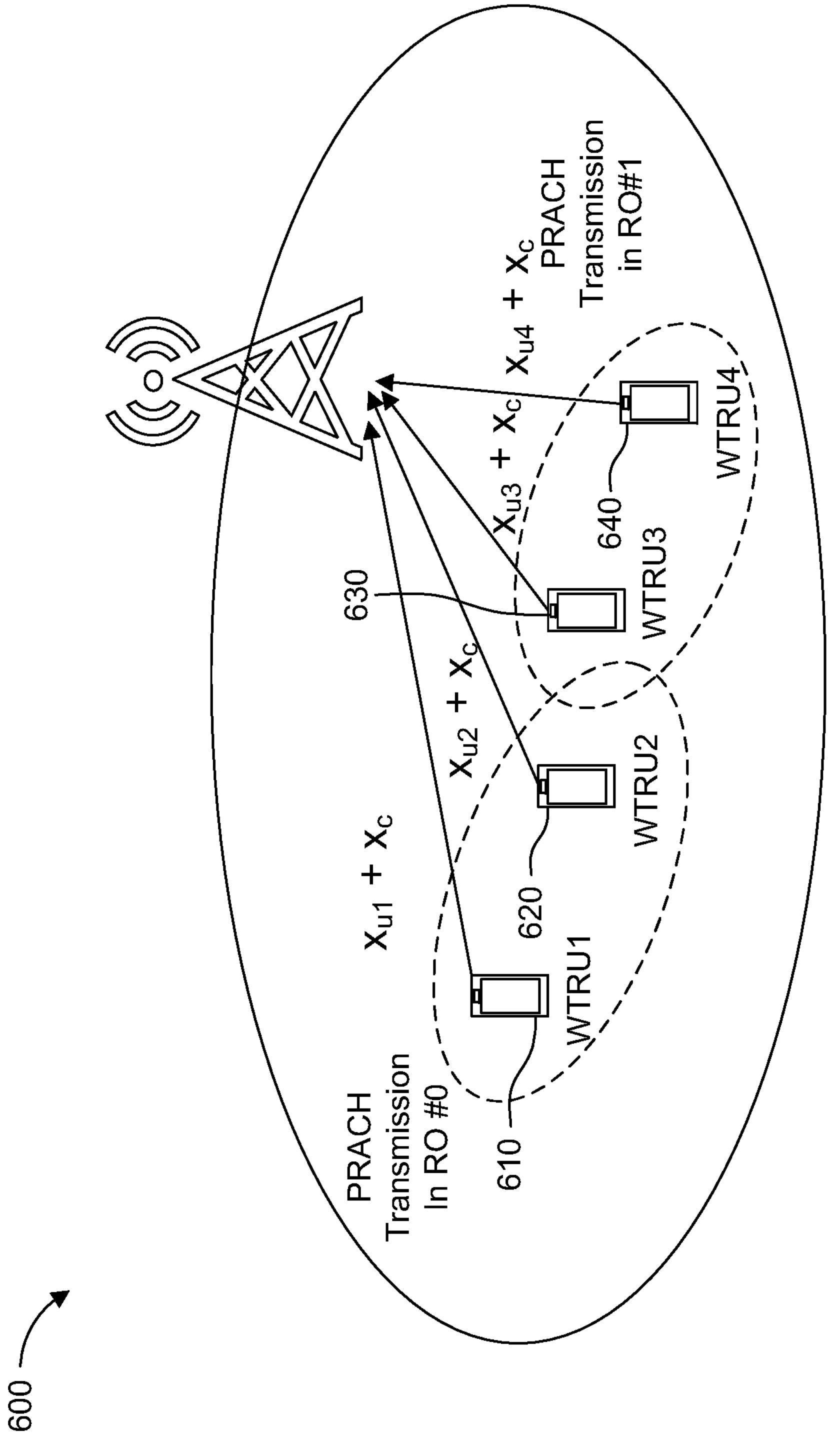
FIG. 6 illustrates an example PRACH transmission.

FIG. 6 illustrates an example PRACH transmission 600. A WTRU 610 and another WTRU 620 perform PRACH transmission in RO 0. A WTRU 630 and another WTRU 640 perform LBT-free and gap-free PRACH transmission in RO 1, upon successful recovery of the cover code in the RO 0 within the RACH slot providing an example to account the LBT in consecutive ROs.

As illustrated in FIG. 6, WTRU1 610 and WTRU2 620 are considered to perform PRACH transmission in the first RO, and WTRU3 630 and WTRU4 640 are considered to perform PRACH transmission in the second RO that follows the first RO consecutively in time. Each WTRU 610,620, 630,640 transmits respective preamble scrambled with the cover-code. In the first RO, WTRU1 610 transmits $x_{u1}+x_C$ and WTRU2 620 transmits $x_{u2}+x_C$. WTRU3 630 and WTRU4 640 may perform blind detection to identify if the COT is reserved for the PRACH transmission by "sequence matching" with one or more of the PRACH cover-codes. Upon successful detection of the PRACH cover-code in the first RO, WTRU3 630 and WTRU4 540 may skip the LBT and perform PRACH transmission in the second RO by sharing and extending the COT. In the second RO, WTRU3 630 transmits $x_{u3}+x_C$ and WTRU4 640 transmits $x_{u4}+x_C$.

As illustrated in FIG. 6, the COT may be shared while complying with the fair channel occupancy. After successful detection of the PRACH channel occupancy cover code and/or reservation signal, the WTRU may continue with transmission of a PRACH preamble, MsgA, and/or Msg3 without LBT or with a shortened LBT. The WTRU's transmission duration may be limited to a period of time, corresponding to at least one of the following: the remaining time in the COT initiated by first other WTRU in the cell using the detected PRACH cover code/signal, the slot boundary, a predefined period, a configured period, a number of slot and/or symbols, and/or a number of slots till the next Fixed Frame Period (FFP) LBT opportunity/IDLE period in a Frame Based Equipment (FBE) frame configuration.

The WTRU may transmit a RACH message without LBT after successful detection of the PRACH channel occupancy cover code and/or reservation signal, conditioned on at least on the following: the remaining time in the COT initiated by a first other WTRU in the cell using the detected PRACH cover code/signal is greater than a configured or predetermined threshold period, the remaining time (or number of symbols) till slot boundary is greater than a predetermined or configured threshold period, and/or the number of PRACH occasion already transmitted in the same COT (e.g., by other WTRUs) is less than a configured or predetermined threshold.

In an example, the WTRU may transmit a RACH message without LBT upon detection of the cover code for period corresponding to the MCOT minus the duration of consecutive PRACH occasions already transmitted in the COT. In another example, the WTRU may transmit RACH messages without LBT. In an example, the WTRU may count the number of RACH transmission occasions using the cover code during the LBT channel sensing procedure. Upon failing LBT, the WTRU may transmit a RACH message without LBT—or with shortened LBT—if the number of RACH occasions transmitted during the LBT procedure is less than a configured or predetermined threshold.

The WTRU may transmit a RACH message without LBT—or with shortened LBT—if it detects or receives signaling from the gNB. The WTRU may determine the maximum number of symbols or slots it can transmit on without LBT if it receives signaling from the gNB, whereby the signaling: indicates the maximum number of slots or symbols, indicates the PRACH cover code sequence or sequence ID, and/or is received on specific symbols or slots prior to the RACH occasion.

The WTRU may determine the remaining time in the COT from the detected cover code during the LBT procedure or prior to the RACH occasion. For example, the WTRU may be configured with a cover code pattern, such that the WTRU determines the previous number of PRACH occasions transmitted in the same COT. The WTRU may increase or change the cover code sequence (e.g., by adding a cyclic shift to the detected cover code in the RACH occasion prior to the WTRU's transmission time).

Efficient selection of preamble sequences may be used. In an example, during the blind detection (e.g., IFFT cross-correlation procedure), the WTRU may identify one or more of the preambles used in the previous ROs at the output of the IFFT (i.e., but for other WTRUs). The IFFT filtering allows detecting all the cyclic shifts used within the given root sequence in a single IFFT operation. The WTRU may detect the preambles that are used within the same root sequence as the root sequence used for PRACH cover-code. The WTRU may expect that the same preambles may be reused in the following ROs by the corresponding WTRUs. The WTRU may avoid selecting the identified preambles to prevent further preambles' collisions and conflicts.

AGC symbols/samples for PRACH blind detection at the WTRU may be used. When PRACH cover code (or COT extension cover code) is used for a PRACH transmission to indicate that one or more subsequent ROs in the same RACH slot may be used for LBT-free PRACH transmission, one or more of following may apply: AGC symbol or sample may be added at the beginning of each RO. For example, AGC symbol or sample may be a copy of the first N symbols or M samples of a PRACH format used for each RO, wherein N and M may be positive integer number including 1. Alternatively, AGC symbol or sample may be repetition of cyclic prefix of the PRACH format. The number ROs in a RACH slot may be determined based on one or more of PRACH format, number of symbols used for uplink, whether AGC symbol/sample is used or not, and whether pre-configured cover code is used or not. The presence of AGC symbol in each RO may be configured or indicated by gNB. The presence of AGC symbol in a RO may be determined based on at least one of PRACH format, number of PRACH preamble repetition, CP length, Gap length.

The COT for LBT-free PRACH transmission may be extended based on dynamic indication from gNB. In an embodiment, a WTRU may receive a set of configurations and/or an indication to transmit LBT free PRACH transmission. The LBT free PRACH transmission may be used to extend the COT when one or more ROs are unused. For example, the WTRU may receive a set of configurations for LBT free PRACH transmission (e.g., via one or more RRC messages). The separate PRACH configuration may be configured for the extension of PRACH and LBT free PRACH transmission, respectively. The set of PRACH configurations may include one or more of one or more of PRACH configuration indices. One or more of following configurations may be configured by providing one or more of PRACH configuration indices including preamble format (e.g., 0, 1, 2, 3 A1, A2, A3, B1, B2, B3 and etc.), x and y for $n_{SFN}$ mod x=y, subframe number, starting symbol. number of PRACH slots within a subframe, PRACH occasions, number of time-domain PRACH occasions within a PRACH slot, PRACH duration, and other configurations related to PRACH configuration. Alternatively, the WTRU may be directly configured with one or more of the above configurations. For example, the WTRU may be configured with preamble formats and PRACH occasions without receiving the PRACH configuration indices.

One or more of PRACH Root sequences for RACH transmission may be in the set of PRACH configurations. The WTRU may be configured with one or more PRACH root sequences for PRACH transmission. For example, the WTRU may apply PRACH root sequences by generating Zadoff-Chu sequences based on one or more PRACH Root sequence indices which are configured by RRC.

One or more of PRACH Root sequences for blind detection may be in the set of PRACH configurations. The WTRU may be configured with one or more PRACH Root sequences for blind detection. For example, the WTRU may scramble the generated PRACH sequences by using the one or more PRACH Root sequences for blind detection. The application of the one or more PRACH Root sequences for blind detection may be based on one or more resources. For example, the WTRU may be configured with a first PRACH Root sequences and a second PRACH Root sequences for blind detection. Based on the configuration, the WTRU may scramble a PRACH sequence with the first PRACH Root sequence for the first resource. The WTRU may scramble a PRACH sequence with the second PRACH Root sequence for the second resource. The resource may be one or more of following: time domain resource (e.g., one or more of RACH Slot, Symbol, Slot and ms), RACH occasion, PRACH Root sequence for RACH transmission, etc.

One or more of PRACH Root sequence indices for COT extension may be in the set of PRACH configurations. For example, the WTRU may scramble the generated PRACH sequences by using the one or more PRACH Root sequences for blind detection. The application of the one or more PRACH Root sequences for blind detection may be based on one or more resources. For example, the WTRU may be configured with a first PRACH Root sequences and a second PRACH Root sequences for blind detection. Based on the configuration, the WTRU may scramble a PRACH sequence with the first PRACH Root sequence for the first resource. The WTRU may scramble a PRACH sequence with the second PRACH Root sequence for the second resource. The resource may be one or more of following: time domain resource (e.g., one or more of RACH Slot, Symbol, Slot and ms), RACH occasion, PRACH Root sequence for RACH transmission, etc.

Transmission type may be included in the set of PRACH configurations. Transmission type may configure one or more of LBT based PRACH transmission, LBT free PRACH transmission and COT extension.

msg1-FDM may be included in the set of PRACH configurations. The number of PRACH transmission occasions FDMed in one-time instance. msg1-FrequencyStart may be included in the set of PRACH configurations. Offset of lowest PRACH transmission occasion in frequency domain with respective to PRB 0. The value is configured so that the corresponding RACH resource is entirely within the bandwidth of the UL BWP.

msg1-SubcarrierSpacing, subcarrier spacing of PRACH, zeroCorrelationZoneConfig, Nos value for Unrestricted set, Restricted set type A or Restricted set type B, preambleReceivedTargetPower including the target power level at the network receiver side, preambleTransMax including max number of RA preamble transmission performed before declaring a failure, and powerRampingStep including power ramping steps for PRACH, may be included in the set of PRACH configurations.

ra-ResponseWindow may be included in the set of PRACH configurations. This includes Msg2 (RAR) window length in number of slots. The network configures a value lower than or equal to 10 ms when Msg2 is transmitted with licensed spectrum channel access and 40 ms when Msg2 is transmitted with shared spectrum channel access.

Total number of RA preambles may be included in the set of PRACH configurations. Total number of preambles used for contention based and contention free random access in the RACH resources defined in RACH-ConfigCommon, excluding preambles used for other purposes (e.g. for SI request).

ssb-perRACH-OccasionAndCB-PreamblesPerSSB may be included in the set of PRACH configurations. The meaning of this field is twofold: the CHOICE conveys the information about the number of SSBs per RACH occasion.

rsrp-ThresholdSSB may be included in the set of PRACH configurations. WTRU may select the SS block and corresponding PRACH resource for path-loss estimation and (re)transmission based on SS blocks that satisfy the threshold msg3-transformPrecoder may be included in the set of PRACH configurations. This enables the transform precoder for Msg3 transmission. If the field is absent, the WTRU disables the transformer precoder.

restrictedSetConfig may be included in the set of PRACH configurations. This is the configuration of an unrestricted set or one of two types of restricted sets.

Based on the configuration, the WTRU may receive an indication to transmit one or more of PRACH transmission. The indication may be based on one or more of RRC configuration, MAC CE and DCI (WTRU specific DCI and/or group DCI). Based on the indication, the WTRU may determine to transmit one or more of LBT based PRACH transmission, LBT free PRACH transmission and COT extension. Based on the determination, the WTRU may support one or more of following operations:

For LBT based PRACH transmission operation, if the WTRU determines to transmit LBT based PRACH, the WTRU may use LBT before PRACH transmission. If the WTRU does not detect any signal based on the LBT, the WTRU may transmit PRACH based on the associated configurations. The WTRU may scramble the PRACH by using the PRACH by using the one or more PRACH sequences for blind detection.

For LBT free PRACH transmission, if the WTRU determines to transmit LBT free PRACH, the WTRU may transmit PRACH without LBT based on the associated configurations. The WTRU may scramble the PRACH by using the one or more PRACH sequences for blind detection.

For COT extension, if the WTRU determines to transmit COT extension, the WTRU may transmit PRACH without LBT based on the associated configurations. The WTRU may scramble the PRACH by using the one or more PRACH sequences for COT extension. Alternatively, if the WTRU determines to transmit COT extension, the WTRU may transmit PRACH by only using the one or more PRACH sequences for COT extension.

The WTRU determination may be based on the indicated information by the gNB. For example, the transmission type. The indication may indicate one or more of LBT based PRACH transmission, LBT free PRACH transmission and COT extension. For example, if the WTRU receives a transmission type as LBT free PRACH transmission, the WTRU may transmit one or more PRACH based on a set of PRACH configurations associated with LBT free PRACH transmission. If the WTRU receives a transmission type as COT extension, the WTRU may transmit one or more PRACH for COT extension based on a set of PRACH configurations associated with COT extension.

Another example includes a trigger of LBT free PRACH transmission and/or COT extension. The WTRU may receive a trigger of LBT free PRACH transmission and/or COT extension. The indication may be based on one or more of following: The WTRU may receive an explicit indication from a gNB. For example, the WTRU may receive one or more of triggers by receiving MAC CE message and/or DCI to transmit LBT free PRACH transmission and/or COT extension.

Another example includes a trigger of a set of PRACH configuration. For example, the WTRU may receive an indication for a set of PRACH configuration among multiple sets of PRACH configurations. The set of PRACH configuration may include a transmission type. Based on the indicated set of PRACH configuration, the WTRU may determine configurations for LBT free PRACH transmission and/or COT extension.

Another example to base WTRU determination includes a trigger of one or more of RACH occasions. For example, the WTRU may receive an indication of one or more of RACH occasions. Based on the indicated one or more of RACH occasions, the WTRU may determine to transmit PRACH based on the configurations associated with the indicated one or more of RACH occasions.

Also, a trigger of one or more of preambles may be used. For example, the WTRU may receive an indication of one or more of preambles. Based on the indicated one or more of preambles, the WTRU may determine to transmit PRACH based on the configurations associated with the indicated one or more of preambles.

WTRU blind detection may be used in the WTRU determination. The WTRU may determine to transmit PRACH for one or more of LBT based PRACH transmission, LBT free PRACH transmission and COT extension if the WTRU blindly detects one or more of signals. The blind detection can be based on the configured PRACH configurations for one or more of PRACH transmission, blind detection and COT extension. For example, the WTRU may try to blindly detect the configured PRACH sequences (e.g., for PRACH transmission and/or COT extension) within the configured RACH occasions and/or RACH slots. The WTRU may determine RACH resources to transmit PRACH based on results of WTRU blind detection. For example, the WTRU may estimate end of the existing PRACH transmission based on the detected sequences and the configured PRACH configurations (e.g., PRACH format). Based on the estimated end of the transmission, the WTRU may transmit PRACH (e.g., for PRACH transmission and/or COT extension) after the estimated end of the transmission.

The application of the one or more PRACH Root sequences (e.g., for blind detection and/or COT extension) may be based on two or more resources. For example, the WTRU may be configured with a first PRACH Root sequence and a second PRACH Root sequence. Based on the configured sequences, if the WTRU determines to transmit PRACH, the WTRU may scramble a PRACH sequence with the first PRACH Root sequence for the first resource. and the second PRACH Root sequence for the second resource, respectively. The resource may be one or more of following: RACH Slots, Symbols, Slots, Subframes, PRACH duration, PRACH configuration, Absolute time (e.g., ms or ns), and RACH occasions, PRACH Root sequences for RACH transmission, etc.

According to an embodiment, a WTRU may receive an indication to transmit one or more PRACHs for a first cell (e.g., one or more of unlicensed band, high frequency band (e.g., FR2-2) and UL cell) from a second cell (e.g., one or more of licensed band, low frequency band (e.g., FR1 or FR2-1) and DL cell). In order to associate the first cell and the second cell, following association methods may be used.

An association method includes configuration of associated PRACH configuration ID of the first cell in one or more control resources in the second cell. The WTRU may receive a configuration of associated PRACH configuration ID of the first cell in one or more control resources in the second cell (e.g., via one or more of RRC and MAC CE). Based on the association, the WTRU may receive one or more of DCIs which indicates PRACH transmission (e.g., one or more of LBT based, LBT free and COT extension) in the one or more control resources of the second cell. Based on the association, the WTRU may transmit PRACH based on the PRACH configuration associated with a control resource which the WTRU detects DCI.

An association method includes configuration of associated control resource ID of the second cell in one or more PRACH configurations of the first cell. The WTRU may receive a configuration of associated control resource ID of the second cell in one or more PRACH configurations of the first cell (e.g., via one or more of RRC and MAC CE). Based on the association, the WTRU may receive one or more of DCIs which indicates PRACH transmission (e.g., one or more of LBT based, LBT free and COT extension) in the one or more control resources of the second cell. Based on the association, the WTRU may transmit PRACH based on the PRACH configuration associated with a control resource which the WTRU detects DCI.

The one or more control resources may be one or more of CORESETs and Search Spaces.

For COT extension using one or more PRACH transmission types, one or more of PRACH transmission types may be used, defined, or determined, wherein a first PRACH transmission type may be a PRACH preamble scrambled with a pre-configured cover code to indicate that a subsequent RO may be used as LBT free PRACH transmission within the RACH slot; a second PRACH transmission type may be just pre-configured cover code without PRACH preamble. A WTRU may send the first PRACH transmission type for LBT based PRACH transmission and/or LBT free PRACH transmission. Therefore, the WTRU may send PRACH to a target gNB as well as indicating to other WTRUs that the subsequent ROs in the same RACH slot may be used for LBT-free PRACH transmission. A WTRU may send the second PRACH transmission type for COT extension when the WTRU is indicated to perform. The second PRACH transmission may be used only to keep the COT (or extend COT) and may allow other WTRUs to perform LBT-free PRACH transmission in a subsequent RO in the same RACH slot. The WTRU may send the second PRACH transmission type in a RACH slot if one or more of following conditions are met. The WTRU is indicated to perform COT extension in one or more RACH slots or ROs (e.g., via RRC, MAC-CE, and/or DCI). The WTRU detected a pre-configured cover code in a previous RO. The remaining number of ROs in the RACH slot is larger than a threshold. Subcarrier spacing is larger (or smaller) than a threshold. The WTRU is not scheduled for UL transmission in the RACH slot. The WTRU has no scheduled/configured UL transmission overlapping with the RO.

When a conflict between second PRACH transmission and an uplink transmission is scheduled/configured for a WTRU, one or more of following may apply. If the conflict occurred in time domain (e.g., symbol or slot), a predefined priority rule may be used to determine which uplink signal is transmitted. For example, the second PRACH transmission type may be higher priority than PUSCH, PUCCH for CSI reporting and SRS transmission; while lower priority than PUCCH for HARQ reporting.

If the conflict occurred in frequency domain (e.g., in different RBs), one or more of following may apply: Option-1: a predefined priority rule may be used to determine which uplink signal is transmitted; and Option-2: transmit both signals (e.g., second PRACH transmission and UL signal scheduled/configured). Either Option-1 or Option-2 may be determined to use based on uplink transmission power. If UL transmission power does not reach to Pc,max-delta$_{margin}$ with Option-2, the Option-2 may be used. Otherwise, Option-1 may be used. The delta$_{margin}$ may be a configured/pre-determined value including 0'.

A WTRU may send the first PRACH transmission type (e.g., LBT-based or LBT-free) in a first RO which may be selected for a PRACH transmission, and the WTRU may send the second PRACH transmission type (e.g., COT extension) in one or more subsequent ROs within the RACH slot.

PRACH transmission type may be interchangeably used with PRACH preamble type, PRACH sequence, PRACH resource type, PRACH resource, PRACH time/frequency resource, PRACH format, and PRACH sequence type. In addition, a pre-configured cover code which may be used to scramble PRACH sequence to indicate a status of one or more subsequent ROs (e.g., in the same RACH slot) may be interchangeably used with RO status indicator, subsequent RO status indicator, COT extension indicator, COT extension code, COT extension cover code, and COT extension sequence.

The COT for LBT-free PRACH transmission may be extended using a determination of the mode of operation based on the cover-codes. A WTRU may be configured to detect presence of a sequence of at least one cover code associated to a PRACH occasion or transmission. The number of cover codes in the sequence may be a function of at least one of the preamble format and subcarrier spacing. Such sequence of at least one cover code may be referred to as "cover code sequence" in the following. A WTRU may scramble a PRACH transmission using a sequence of cover codes. Each cover code of the sequence may scramble a specific portion of the PRACH transmission in time or frequency domains. For example, a PRACH transmission may consist of two portions in time domain. The WTRU may scramble first and second portions with first and second cover codes of the sequence respectively. A WTRU may be configured to detect one of a set of at least one cover code sequence in a RACH occasion using one of the solutions described in the above, such as sequence matching. The set of at least one cover code sequence may be referred to as "candidate set" in the following. The WTRU may perform at least one action depending on which cover code sequence of the candidate set is detected, as described.

The cover code sequence for PRACH transmission may depend on detected cover code sequence may be used. In a solution, the WTRU may determine whether to transmit a PRACH or a PRACH scrambled by a first cover code sequence in a first RACH occasion (or set of thereof) based on the identity of a second cover code sequence detected in a second RACH occasion. The first and second RACH occasion may have a pre-defined timing relationship. For example, the first occasion may immediately follow the second occasion in time. The identity of the first cover code sequence may also be a function of the identity of a second cover code sequence within a candidate set. In an example, the WTRU may determine to transmit a PRACH scrambled by a specific cover code sequence of a candidate set if it determines that the channel is not busy (LBT success) during a preceding period. For example, a candidate set may consist of four (4) cover code sequences.

A WTRU may apply the following behaviors. In case the WTRU determines that the channel is not busy (LBT success), the WTRU may transmit a PRACH scrambled by the first cover code sequence of the set in the subsequent RACH occasion. In case the WTRU detects the first cover code sequence of the set in a RACH occasion, the WTRU may transmit a PRACH scrambled by the second cover code sequence of the set in a subsequent RACH occasion. In case the WTRU detects the second cover code sequence of the set in a RACH occasion, the WTRU may transmit a PRACH scrambled by the third cover code sequence of the set in a subsequent RACH occasion. In case the WTRU detects the third cover code sequence of the set in a RACH occasion, the WTRU may transmit a PRACH scrambled by the fourth cover code sequence of the set in a subsequent RACH occasion. In case the WTRU detects the fourth cover code sequence of the set in a RACH occasion, the WTRU may not transmit a PRACH in a subsequent RACH occasion. In case the WTRU determines that the channel is busy (LBT failure) and does not detect a cover code sequence (or detects the fourth cover code sequence), the WTRU may not transmit a PRACH in a subsequent RACH occasion.

The above example provides implementation of a maximum number of successive RACH occasions that can be reserved by a set of WTRUs for PRACH transmission. Such maximum may correspond to a maximum channel occupation time (COT) duration.

The number of RACH occasions may be determined from detected cover code sequence. In an example, the WTRU may determine a set of RACH occasions on which it may transmit PRACH (or PRACH scrambled by a cover code sequence) based on the identity of a cover code sequence detected in a previous RACH occasion.

Examples for obtaining candidate set of cover code sequences are also provided. A candidate set of cover code sequences may be a function of at least time (e.g. system frame number, slot, symbol position), RACH occasion, PRACH format, subcarrier spacing or PRACH configuration according to a pre-defined function. A cover code sequence may be derived from at least one parameter such as an index. A candidate set of cover code sequence may be derived from at least one parameter such as an index or a set of indexes. The at least one parameter may be referred as candidate set information in the following.

The WTRU may determine candidate set information from physical layer, MAC, RRC signaling or a combination thereof. For example, the candidate set information may be included as part of an enhanced PRACH configuration. In another example, candidate set information may be received from group-common PDCCH or WTRU-specific PDCCH such as a PDCCH order for RACH.

In an example with multiple detected cover code sequences, the WTRU detects the presence of more than one cover code sequence from the candidate set, the WTRU may perform actions according to one (i.e. single one) of the detected cover code sequences. The WTRU may determine such cover code sequence according to a pre-determined rule such as the order of the cover code sequence within a set. For example, the WTRU may select the sequence with the highest order within the candidate set. Alternatively, the WTRU may select the cover code sequence for which sequence matching results in the largest likelihood.

The COT for LBT-free PRACH transmission may be extended with support of the PRACH transmission from a WTRU in multiple consecutive ROs. A WTRU may transmit PRACH in multiple ROs in one or more RACH slots. The WTRU may select the set of ROs on which to transmit a PRACH preamble (or to attempt to acquire a channel to transmit a PRACH preamble) based on a number of factors.

For example, the associated SSB(s) may be used. For example, the WTRU may transmit PRACH on one or more ROs based on whether the ROs are associated to a single SSB. This may be considered PRACH repetition. In another example, the WTRU may transmit PRACH on one or more ROs based on the set of SSBs to which the set of ROs are associated. In this example, the WTRU may transmit PRACH in the ROs for which the associated SSBs are for the same beam, or for QCL beams. In another example, the WTRU may transmit PRACH on one or more ROs based on the set of SSBs to which the set of ROs are associated. In this example, the WTRU may transmit PRACH in the ROs for which the set of SSBs are configured for a set of associated beams. The association between beams forming a set of associated beams may be pre-configured, indicated by higher layers, determined from measurements, or determined from an associated to a single LBT procedure or a single set of LBT parameters. For example, a WTRU may transmit PRACH in a set of ROs, associated to a set of SSBs, if the set of SSBs is associated in a manner that a single LBT is required to initiate a COT that is applicable to the set of beams associated to the set of SSBs.

The timing of the ROs may be used. For example, a WTRU may transmit on a set of ROs if they are adjacent to each other without any gaps. In another example, a WTRU may transmit on a set of ROs only if there are gaps between at least one (e.g. all) ROs. In another example, a WTRU may transmit on a set of ROs only if there are gaps between subsets of ROs, where each subset of ROs may be associated to a single LBT procedure and different subsets of ROs may be associated to different LBT procedures. In such a case, gaps between subsets of ROs may be required.

Reception of an indication that a COT has been initiated by a serving cell or by another WTRU within the serving cell. For example, a WTRU may only transmit on a set of ROs if the WTRU has detected a cover code transmission from another WTRU within the cell indicating that a COT has been initiated. The WTRU may determine the set or subset of ROs to which the COT is associated and may transmit without LBT only on the set or subset of ROs to which the COT is associated.

LBT for multiple PRACH transmissions in multiple ROs may be used. A WTRU may perform LBT prior to transmission of one or more PRACH preambles on one or more ROs. Upon determining the channel is idle, the WTRU may transmit one or more PRACH preambles on one or more ROs without needing subsequent LBT. The WTRU may determine whether to perform LBT prior to a PRACH preamble in a RO based on a variety of factors.

The timing of the RO may be used. For example, the WTRU may perform LBT prior to the first RO that it intends to use. In another example, the WTRU may perform LBT prior to the first RO of a set of associated RO. The set of associated ROs may be defined as a set of ROs for which a single LBT is required.

The timing of a last LBT applicable to the RO may be used. For example, a WTRU may perform an LBT prior to a first RO in a set of associated ROs. The WTRU may initiate a COT of a specific duration for transmissions of RO without requiring LBT. The WTRU may perform a second LBT for transmission on a RO if the COT duration has elapsed.

Parameters associated to the ROs may be used. For example, a WTRU may transmit PRACH preambles on a set of ROs. Such a set may be subdivided into subsets, each associated to a different beam or different QCL index or different associated SSB. The WTRU may perform LBT prior to each subset(s) of ROs.

LBT type or parameter of a previous LBT operation may be used. For example, a WTRU may perform a first LBT of a first LBT type or first set of LBT parameters, for transmission of PRACH preamble on a first (sub)set of ROs. The WTRU may determine that a second (sub)set of ROs may require a second LBT of a second LBT type of a second set of LBT parameters. In such a case, the WTRU may perform the second LBT prior to transmission of PRACH preamble on the second (sub)set of ROs. In an example, the WTRU may perform LBT on a first beam associated to a first subset of ROs. The WTRU may perform LBT on a second beam, prior to transmitting PRACH preamble on a second subset of ROs associated to a second beam.

Whether there are gaps between ROs may be used. A WTRU may perform LBT before a second RO if there is a gap between a first and second consecutive ROs.

Size of a gap between two consecutive ROs may be used. The WTRU may perform LBT prior to a second RO if the gap between the first and second RO is greater than a threshold.

Reception of an indication may be used. For example, a WTRU may receive an indication to perform or not to perform an LBT prior to an RO. Such an indication may be received from the gNB or may be received from a second WTRU (e.g. indicating that the second WTRU has initiated a COT that may be shared with the first WTRU).

A WTRU may be configured with time instances when to perform LBT for a (sub)set of ROs. If the WTRU successfully initiates a COT during one of the configured time instances, the WTRU may transmit PRACH preambles in the (sub)set of ROs without needing further LBT. The WTRU may be required to transmit PRACH preambles in all of the associated (sub)set or ROs. If the WTRU does not transmit a PRACH preamble in one of the associated ROs, a gap may be created. The WTRU may need to perform an LBT procedure prior to transmitting a PRACH preamble in a subsequent RO of the (sub)set.

According to an example, if the WTRU determines the channel is busy during an LBT procedure, the WTRU may not transmit PRACH preamble in any (e.g. all) of the ROs in the (sub)set.

According to an example, if the WTRU determines the channel is busy during an LBT procedure for a (sub)set of ROs, the WTRU may perform LBT at another time (e.g. prior to a subsequent RO) to enable transmission of PRACH preamble on some of the (sub)set of ROs. For example, a subset of ROs may be composed of x ROs (possibly all associated to the same SSB). The WTRU may perform LBT prior to the first RO. If the WTRU successfully initiates a COT, the WTRU may transmit PRACH preambles on all ROs without needing a subsequent LBT procedure. On the other hand, if the WTRU determines that the channel is busy prior to the first RO, it may not transmit PRACH preamble in the first RO. The WTRU may perform LBT prior to a subsequent RO (e.g. the second RO). If the WTRU is determines the channel is idle, the WTRU may transmit PRACH preamble in the second RO and all subsequent ROs in the (sub)set without requiring further LBT. On the other hand, if the LBT prior to the second RO determines the channel is busy, the WTRU may not transmit in the second RO and may perform LBT in a future occasion within the (sub)set of ROs.

A set of ROs may be associated with an SSB or a beam or a QCL index. In the case where all ROs in the set are associated to the same beam, the WTRU may perform LBT on the beam prior to transmitting PRACH preamble on one or more ROs of the set. In another method, a set of ROs may be associated with a set of SSBs or multiple beams or multiple QCL indices. In such a case, the WTRU may perform LBT on a beam that is determined from the beams associated to one or more ROs in the set. The WTRU may determine the LBT beam as a function of at least one of: Beam or SSB or QCL index of one RO in the set. For example, a set may have a primary RO from which the WTRU may determine the LBT beam. The primary RO may be the first RO of a set of ROs; Beam covering all beams of the ROs in the set. For example, the WTRU may perform LBT on a beam that covers or encompasses all the beams in the set of ROs. Beam covering may be defined such that the main beam of the LBT overlaps all the main beams associated to each RO in the set; and Beam covering all beams of the remaining ROs in the set. For example, if a WTRU performs LBT for a subset of the ROs in the set, the beam may cover all the beams in the subset of the set of ROs.

A WTRU may determine if an LBT procedure is required prior to the transmission of a PRACH preamble in a RO based on whether a previous LBT used for a still valid COT covers the beam associated to the RO. For example, a WTRU may perform a first LBT on a beam prior to a first set of ROs. The WTRU may determine the first LBT beam as a function of the beam(s) associated to the ROs in the first set of ROs. Prior to transmitting PRACH preamble in a second set of ROs, the WTRU may determine that the first LBT beam is also applicable to the second set of ROs. If the COT is still valid (i.e. the COT duration has not expired), the WTRU may transmit PRACH preambles in the second set of ROs without performing LBT.

A WTRU may be configured with multiple RO types. Each RO type may be associated to different PRACH preamble formats (e.g. SCS, sequence length, duration). A first RO type may enable time to perform LBT prior to the transmission of the PRACH preamble. A second RO type may not include a gap to perform LBT prior to the transmission of the PRACH preamble. The WTRU may select the RO type based on whether or not LBT is required prior to the transmission of the PRACH preamble. According to an embodiment, the RO type may be configured for specific time instances. In another solution, the WTRU may determine the RO type to use for one or more time instances. A WTRU may also be configured with multiple RACH slot configurations. In a first RACH slot configuration, a WTRU may be configured with adjacent ROs without LBT gaps. In a second RACH slot configuration, a WTRU may be configured with LBT gaps between some or all ROs. The WTRU may receive an indication from the gNB on which RACH slot configuration to use prior to the RACH slot. For example, a WTRU may receive an SSB or PBCH or DCI indicating the RACH slot configuration of one or more subsequent RACH slots. In another method, a WTRU may determine which RACH slot configuration to use as a function of reception of a signal from another WTRU. In yet another method, a WTRU may determine which RACH slot configuration to use as a function of measurements or LBT performance or PRACH parameter.

Figure 7:
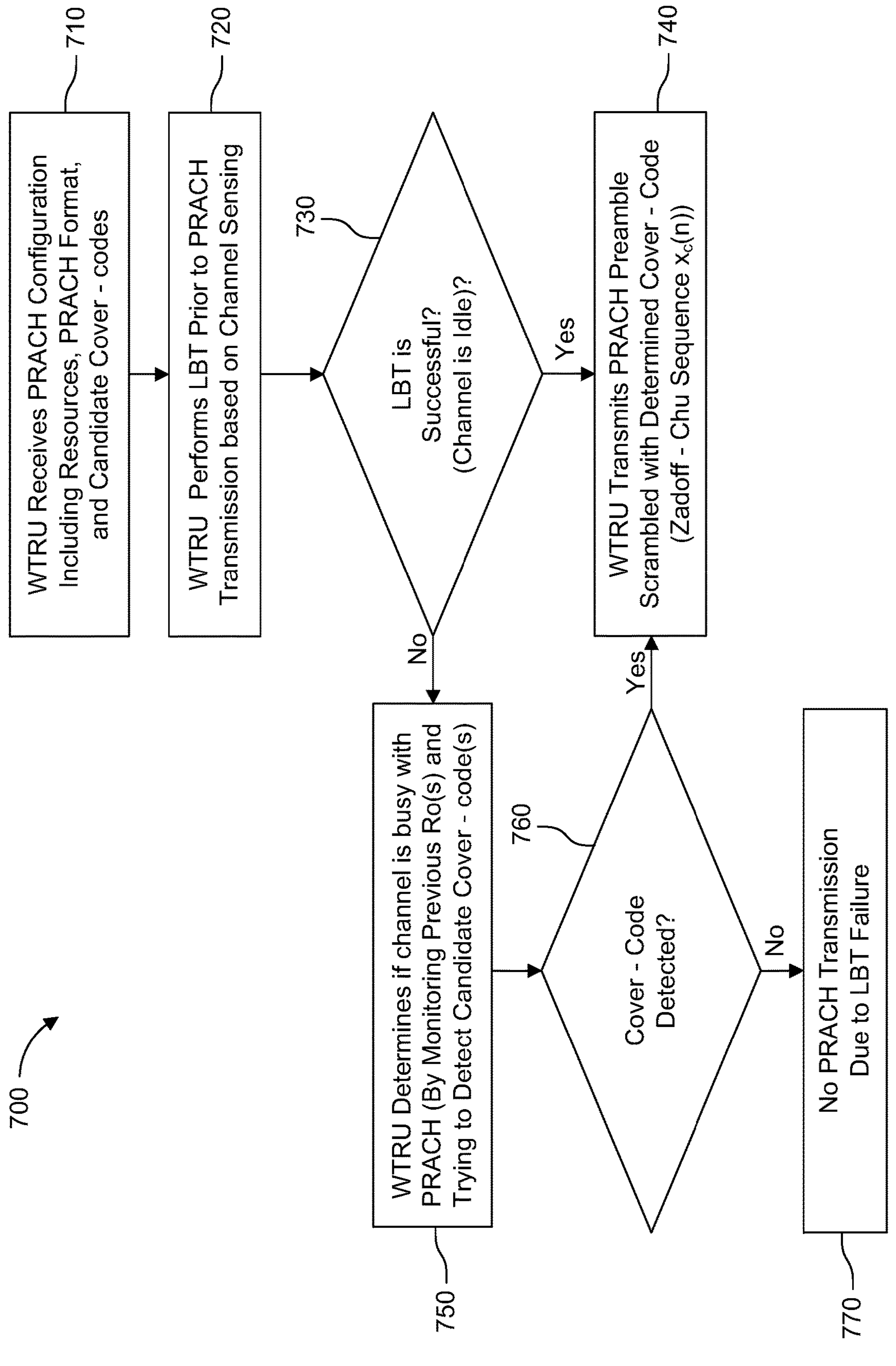
FIG. 7 illustrates a method 700 performed for PRACH in higher frequencies.

FIG. 7 illustrates a method 700 performed for PRACH. In association with the description above, method 700 includes the WTRU receiving PRACH configuration including at least one candidate cover-code at 710. The PRACH configuration may also include resources and PRACH format. At 720, method 700 includes the WTRU performing LBT prior to PRACH transmission based on channel sensing, for example, performing LBT in a first RACH RO that is prior to a second RO. At 730, method 700 includes determining if the LBT is successful, i.e., is the channel idle.

If the determination in 730 is no, then method 700 includes the WTRU determining if the channel is busy with PRACH by monitoring previous ROs and attempting to detect candidate cover-codes at 750, for example, detecting if there is a first PRACH preamble transmission in the first RO scrambled with a first cover-code from among the at least one candidate cover-code. The WTRU determining if the channel is busy with PRACH by monitoring previous ROs and attempting to detect candidate cover-codes at 750 is described above in greater detail with respect to FIG. 5.

A determination is made at 760 if the cover-code is detected. If the cover-code is detected, then method 700 includes the WTRU transmitting PRACH preamble scrambled with the determined cover-code (Zadoff-Chu sequence $x_{c(n)}$ at 740. For example, on a condition that the first PRACH preamble transmission scrambled with the first cover-code is detected in the first RO, the WTRU transmits a second PRACH preamble scrambled with a second cover-code from among the at least one candidate cover-code in the second RO.

Optionally, if the cover-code is not detected, then method 700 includes no PRACH transmission due to LBT failure at 770. For example, on a condition that no PRACH preamble transmission scrambled with a cover-code from among the at least one candidate cover-code is detected in the first RO, no PRACH preamble is to be transmitted in the second RO due to the LBT failure.

Optionally, if the determination in 730 is yes, then method 700 includes the WTRU transmitting PRACH preamble scrambled with the determined cover-code (Zadoff-Chu sequence $x_{c(n)}$) at 740, for example, transmitting a third PRACH preamble scrambled with a third cover code from among the at least one candidate cover-code in the second RO. The WTRU transmitting PRACH preamble scrambled with the determined cover-code (Zadoff-Chu sequence $x_{c(n)}$) at 740 is described above in greater detail with respect to FIG. 4.

According to method 700 performed for PRACH, it is possible to perform PRACH transmissions in consecutive ROs.

Decomposition of PRACH occasions for operation without beam switching gaps between consecutive ROs is disclosed. A WTRU may receive, identify, or be configured with the time domain resource allocations for the consecutive ROs based on the higher-layer parameter prach-ConfigurationIndex, or by msgA-PRACH-ConfigurationIndex if configured. These parameters, higher-layer parameter prach-ConfigurationIndex, or by msgA-PRACH-ConfigurationIndex, denote the PRACH configuration index corresponding to tables that include random access parameters.

One or more of the following parameters may be derived from the table that include random access parameters. Preamble format may refer to one of the possible formats, namely: A1, A2, A3, B1, A1/B1, A2/B2, A3/B3, B4, C0, C2. The preamble format identifies the corresponding Cyclic Prefix (CP) duration, sequence part duration, and guard time duration (if applicable). The frame number and slot number indicates the frames that may be used for the PRACH transmission and the PRACH slot within the corresponding frame. The starting symbol determines the symbol-level index corresponding to the starting position of the first RO transmission within the PRACH slot. The number of PRACH slots within a 60 kHz slot, defines the number of PRACH slots within the reference PRACH slot, e.g., for higher SCS such as 120 kHz, 480 kHz, 960 kHz, considering the 60 kHz PRACH slot as the reference slot. The number of time-domain PRACH occasions within a PRACH slot (Nt_RAslot),defines the number of consecutive ROs that are located within a PRACH slot in time domain. The PRACH duration corresponds to the preamble format implying the number of sequence part within an RO.

Alternatively, a WTRU may receive the frequency domain resource allocations for the ROs based on one or more of the following higher-layer parameters: msg1-FrequencyStart or msgA-RO-FrequencyStart if configured, indicates the offset of the lowest PRACH transmission occasion in frequency domain with respect to the PRB 0; and msg1-FDM or msgA-RO-FDM if configured, indicates the number of PRACH transmission occasions that are FDMed in one time-domain RO. The WTRU may receive, identify, or be configured with the number of ROs in frequency domain (M) per each time-domain PRACH occasion based on the higher parameter msg1-FDM, msg1-FDM-16, or msgA-RO-FDM if configured, msg1-FDM={one, two, four, eight}. The WTRU may number the PRACH frequency resources nRA={0, 1, . . . , M−1}, starting from the lowest frequency, in increasing order in the initial uplink BWP during the initial access or the active uplink BWP otherwise.

The WTRU may receive the association and mapping between the SS/PBCH block indexes and PRACH transmission occasions based on higher layer parameter ssb-perRACH-OccasionAndCB-PreamblesPerSSB={⅛, ¼, ½, 1,2, 4,8,16}. The higher layer parameter indicates the number of SS/PBCH block indexes associated with a PRACH transmission occasion in addition to the number of preambles per SS/PBCH block index per PRACH occasion.

Figure 8:
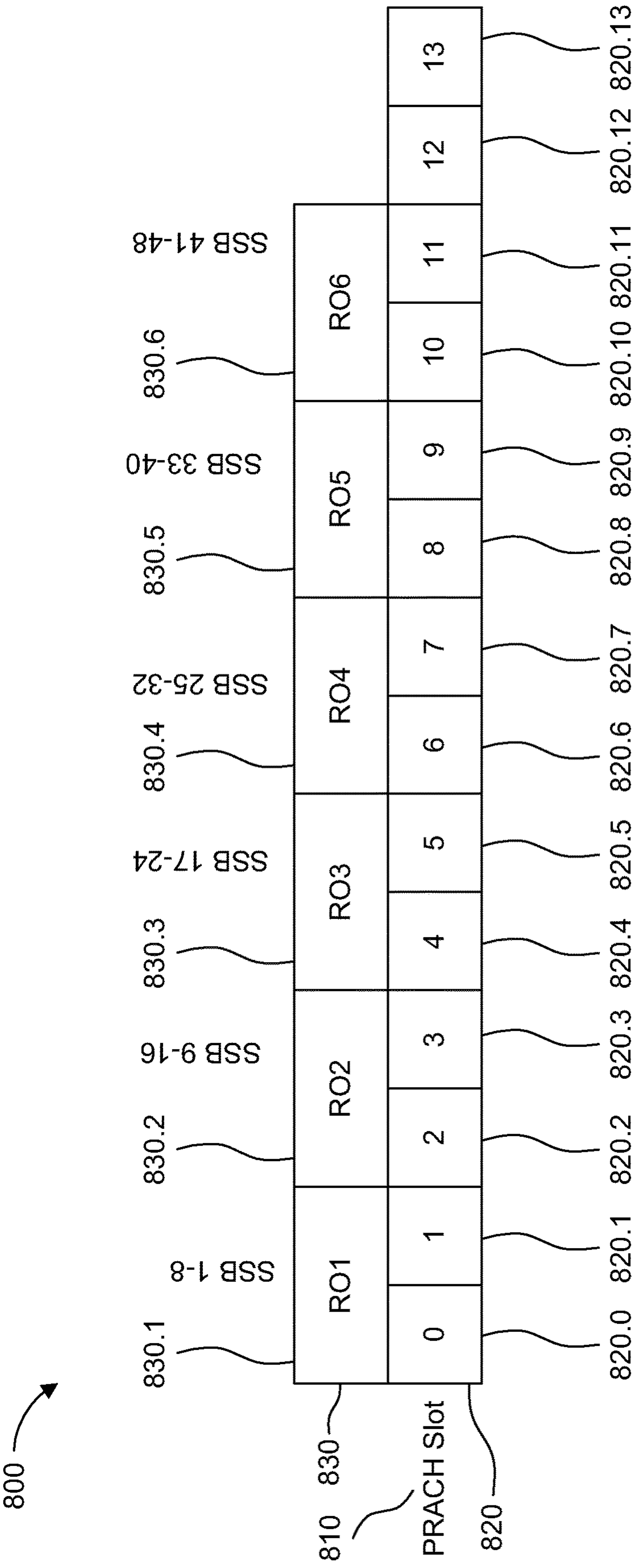
FIG. 8 illustrates an example of a PRACH RO configuration with prach-ConfigurationIndex equal to zero.

FIG. 8 illustrates an example of a PRACH RO configuration 800 with prach-ConfigurationIndex equal to zero. As described, without loss of generality, the index prach-ConfigurationIndex equal to zero is considered, however the same principles can be applied for other PRACH configurations. The PRACH slot 810 is typically provided as illustrated in FIG. 8 with preamble format A1, starting symbol=0, PRACH duration=2, number of time domain PRACH occasions within a PRACH slot=6, msg1-FDM=8, and ssb-perRACH-OccasionAndCB-PreamblesPerSSB=1. Symbols 820 may include symbol 0 $\mathbf{820}_0$, symbol 1 $\mathbf{820}_1$, symbol 2 $\mathbf{820}_2$, symbol 3 $\mathbf{820}_3$, symbol 4 $\mathbf{820}_4$, symbol 5 $\mathbf{820}_5$, symbol 6 $\mathbf{820}_6$, symbol 7 $\mathbf{820}_7$, symbol 8 $\mathbf{820}_8$, symbol 9 $\mathbf{820}_9$, symbol 10 $\mathbf{820}_{10}$, symbol 11 $\mathbf{820}_{11}$, symbol 12 $\mathbf{820}_{12}$, symbol 13 $\mathbf{820}_{13}$, (collectively referred to as symbols 820). RO1, RO2, . . . , RO6 830 represent the ROs in time domain where each RO implies 8 PRACH occasion in frequency resources. ROs 830 may include RO1 $\mathbf{830}_1$, RO2 $\mathbf{830}_2$, RO3 $\mathbf{830}_3$, RO4 $\mathbf{830}_4$, RO5 $\mathbf{830}_5$, RO6 $\mathbf{830}_6$ (collectively referred to as ROs 830). The PRACH RO configuration 800 provides PRACH transmissions corresponding to up to 48 SSB indexes in a single PRACH slot. When operating in high frequencies with high subcarrier spacings, e.g., SCS 960 kHz, the cyclic prefix (CP) length may not be long enough to accommodate the beam switching delays between consecutive ROs.

Modes of operation for PRACH transmission are described. According to a configuration, a WTRU may receive, determine, or be configured with the CP length in the PRACH transmission for the corresponding SCS that is not long enough to accommodate beam switching gap between consecutive ROs. The WTRU may determine or be configured to perform the PRACH transmission based on one of the following modes.

In a first mode, the WTRU performs a PRACH transmission while considering one or more symbol gaps in time-domain between the consecutive ROs. In another mode, the WTRU performs a PRACH transmission without any gaps in time-domain, by decomposing the PRACH transmission occasions.

According to a configuration, a WTRU may perform PRACH transmission based on the first mode. In Mode 1, the WTRU may be configured to insert/consider one or more symbol-level switching gaps based on one of the following between time-domain PRACH occasion and based on indication. For example, between time-domain PRACH occasions, the WTRU may insert/consider one or more symbol-level gap between consecutive ROs 830. The WTRU may not consider/insert a gap before the first RO within a PRACH slot. The WTRU may not consider/insert a gap after the last RO within a PRACH slot. The WTRU may accommodate as many ROs as possible within a PRACH slot.

Alternatively, the WTRU may accommodate ROs 830 within a PRACH slot only up to the symbol indexes that were supposed to be used for PRACH transmission based on the original configurations. In an example, illustrated in FIG. 9 described below, there are no more PRACH transmission performed after symbol index 10 $\mathbf{820}_{10}$ in the first PRACH slot. The WTRU may continue to the next PRACH slot $\mathbf{820}_2$ to send the remaining ROs 830. The WTRU may determine or be configured with the location of the next PRACH slot based on one of the following: WTRU may receive, identify, or be configured with the frame number and the slot number of the corresponding frame for the next PRACH slot by higher layer parameters, e.g., DCI, RRC; WTRU may determine the next PRACH slot to be the next consecutive slot, and WTRU may determine the next PRACH slot to be the next available PRACH slot.

Figure 9:
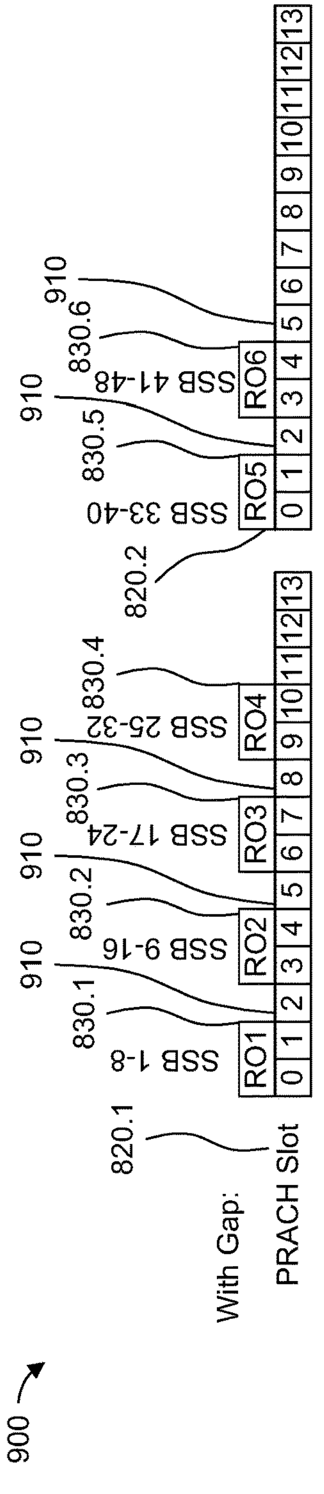
FIG. 9 illustrates an example PRACH RO configuration prach-ConfigurationIndex equal to zero with switching gaps.

For example, based on indication, the WTRU may receive, identify, or be configured with the specific time-domain ROs 830 before/after which WTRU may insert/consider one or more symbol-level gaps. The WTRU may receive a bitmap indicating the time-domain ROs 830 that require gaps before/after their transmission. In an example, for the RO 830 configuration with prach-ConfigurationIndex equal to zero, the WTRU may consider a switching gap only after RO1 $\mathbf{830}_1$, RO2 $\mathbf{830}_2$, RO3 $\mathbf{830}_3$, RO4 $\mathbf{830}_4$, or RO5 $\mathbf{830}_5$. Alternatively, for the RO 830 configuration with prach-ConfigurationIndex equal to zero, the WTRU may consider a switching gap only before RO2 $\mathbf{830}_2$, RO3 $\mathbf{830}_3$, RO4 $\mathbf{830}_4$, RO5 $\mathbf{830}_5$, or RO6 $\mathbf{830}_6$. The WTRU may receive an index to a table indicating the combination for which WTRU may insert/consider switching gaps before/after the time-domain ROs 830. The WTRU may receive one or more indexes to determine the combination of the ROs 830 that need insertion gaps before/after, e.g. combination (Nt_RAslot,g), where g is the number of ROs 830 that need insertion gaps before/after them. In an example, the first mode is illustrated in FIG. 9, where a symbol gap 910 is inserted in time-domain and between each of the consecutive ROs. Specifically, FIG. 9 illustrates an example PRACH RO configuration prach-ConfigurationIndex equal to zero with switching gaps 910.

PRACH transmission in another mode is described below. According to a configuration, a WTRU may perform PRACH transmission based on another mode. In this mode, the WTRU may perform PRACH transmission without any gaps in time-domain between consecutive ROs 830.

According to a configuration, the WTRU may decompose the PRACH transmission occasions in frequency domain into two parts and accommodate the transmission within two time-domain ROs 830. In this configuration the total PRB resources may be the same as the original configuration.

The WTRU may define or determine a new parameter msg1-FDM-half (M') which is half the original higher layer parameter msg1-FDM, i.e., msg1-FDM-half=msg1-FDM/2 (M'=M/2). In the example, for prach-ConfigurationIndex equal to zero 800 provided in FIG. 8 with preamble format A1, number of time domain PRACH occasions within a PRACH slot=6, and msg1-FDM=8, the new parameter msg1-FDM-half will be equal to M'=4. This results in 12 PRACH transmission occasions in time-domain 1000, illustrated in FIG. 10, instead of the original 6 ROs 830; the total allocated resources may be the same as the original configuration, as only half of the frequency resources are used. The WTRU may perform mapping of the SS/PBCH block indexes to the new allocation of the PRACH occasions in the following order, although the specific order may be altered. First, in increasing order of the SS/PBCH block indexes in a single PRACH occasion. Second, in increasing order of frequency resource indexes, nRA={0, 1, . . . , M'−1}, where M'=M/2. Third, in increasing order of the time resource indexes within a PRACH slot. Fourth, in increasing order of indexes for PRACH slots.

Figure 10:
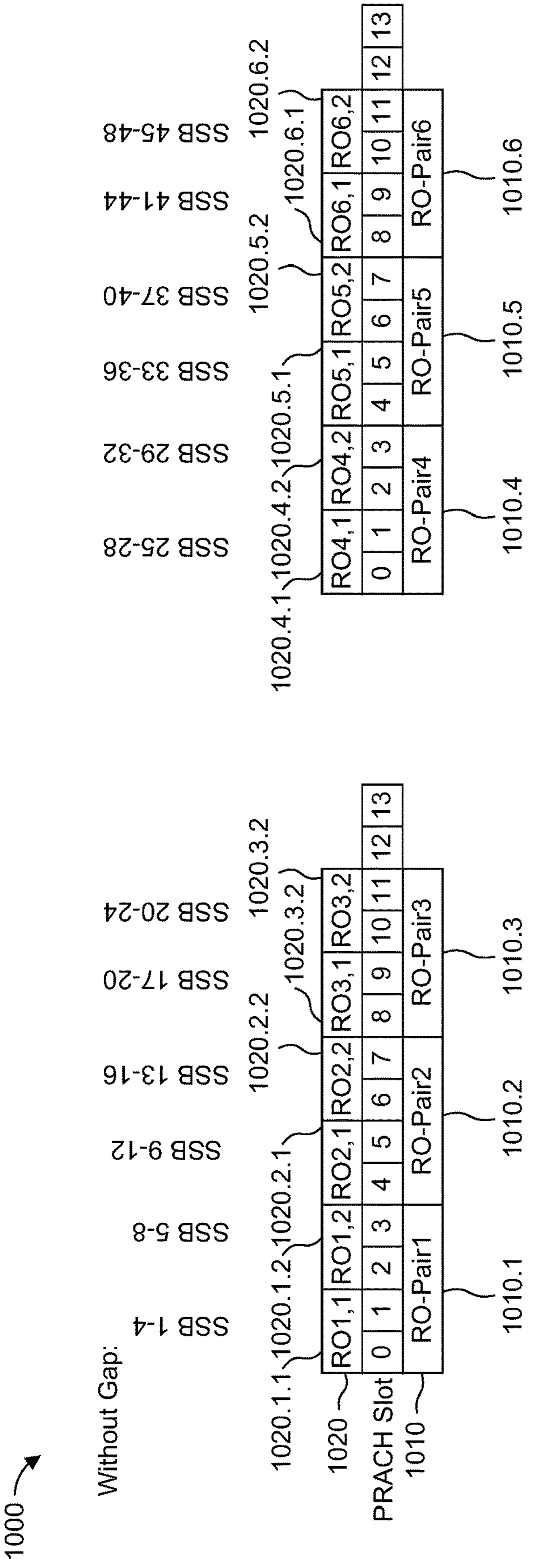
FIG. 10 illustrates an example PRACH RO configuration with reallocated RO resources.

In an example, due to the decomposition of the ROs, the WTRU may consider the new configuration of the consecutive ROs 830 as RO-pairs 1010. As illustrated, RO pairs 1010 may include RO-pair 1 1010$_1$, RO-pair 2 1010$_2$, RO-pair 3 1010$_3$, RO-pair 4 1010$_4$, RO-pair 4 1010$_5$, RO-pair 6 1010$_6$ (collectively referred to as RO-pairs 1010). The WTRU may adjust each original RO 830, that is affected by decomposition, into two consecutive ROs in time domain denoted as RO-pairs 1010. Each RO-pair 1010 may span across two time-domain PRACH occasions in time, and M' frequency-domain PRACH occasions in frequency as illustrated in FIG. 10. Each RO-pair 1010 may include the mappings allocated to one original RO 830 in the original configuration 800 in FIG. 8.

The WTRU may continue to the next PRACH slot to send the remaining ROs. The WTRU may determine or be configured with the location of the next PRACH slot based on one of the following: WTRU may receive, identify, or be configured with the frame number and the slot number within the corresponding frame for the next PRACH slot by higher layer parameters, e.g., DCI, RRC; WTRU may determine the next PRACH slot to be the next consecutive slot, and WTRU may determine the next PRACH slot to be the next available PRACH slot.

In an example, the WTRU may operate with the switching of the antennas corresponding to the ROs taking place alternatively. The WTRU may determine that since gNB may handle and receive the frequency-domain PRACH occasions within a single original RO in time-domain without a beam switching, the gNB does not need to perform beam switching once they are re-allocated/decomposed into two consecutive PRACH occasions in time-domain. For example, as illustrated in FIG. 10, an example of PRACH transmission occasion where the consecutive ROs may take place within a RO-pair 1010 without a need for beam switching gap is described.

FIG. 10 illustrates an example PRACH RO configuration with reallocated RO resources 1000. The WTRU may use the switching of the antennas corresponding to the ROs that are mapped to the first RO within a RO-pair 1010 (first half of the original RO) takes place during the second RO within the RO-pair 1010 (second half of the original RO). In example 1000, illustrated in FIG. 10, where RO-Pair 1 1010$_1$ represent RO1 830$_1$ in the original PRACH occasion configuration and RO1,1 1020$_{1.1}$ and RO1,2 1020$_{1.2}$ denote the first half and the second half of the original PRACH occasion configuration, respectively. Since the antenna switching corresponding to the first set of ROs within RO-Pair 1 1010$_1$, i.e. RO1,1 1020$_{1.1}$, takes place during the second PRACH occasion within RO-pair-1 1010$_1$, i.e. RO1,2 1020$_{1.2}$, then there is no need for the beam switching gap before the next PRACH occasion or RP-pair 1010, e.g., RO2,1 1020$_{2.1}$ or RO-Pair 2 1010$_2$.

The WTRU operates with the switching of the antennas corresponding to the ROs 830 that are mapped to the second RO 1020$_{1.2}$ within a RO-pair 1010$_1$ (second half of the original RO) takes place during the first RO within the next RO-pair 1010$_2$ (first half of the next original RO). In FIG. 10, where RO-Pair 1 1010$_1$ represent RO1 830$_1$ in the original PRACH occasion configuration and RO1,1 1020$_{1.1}$ and RO1,2 1020$_{1.2}$ denote the first half and the second half of the original PRACH occasion configuration, respectively. RO-Pair2 1010$_2$ represent RO2 830$_2$ in the original PRACH occasion configuration and RO2,1 1020$_{1.1}$ and RO2,2 1020$_{2.2}$ denote the first half and the second half of the original PRACH occasion configuration, respectively. Since the antenna switching corresponding to the second set of ROs within RO-Pair 1 1010$_1$, i.e., RO1,2 1020$_{1.2}$, takes place during the first PRACH occasion within RO-pair-2 1010$_2$, i.e., RO2,1 1020$_{2.1}$, then there is no need for the beam switching gap before the next PRACH occasion, e.g., RO2,2 1020$_{2.2}$. The WTRU may assume the same sequential PRACH occasions and beam switching for the rest of the PRACH occasions within the PRACH slot without any need for a beam switching gap.

Alternatively, a WTRU may determine the decomposition of PRACH occasions without considering RO-pairs 1010. The WTRU may determine the PRACH occasion frequency-domain resources to be half the original configuration, e.g., M'=M/2. The WTRU may perform the mapping of PRACH occasions through the consecutive ROs in time, frequency, and PRACH slots if required. The WTRU may determine the need for the switching gap based on one of the following modes of operation:

Between two ROs 830 resulting from decomposition: the WTRU may determine that the two consecutive PRACH occasions in time domain are parts of an original RO 830 in time domain that was decomposed into two consecutive ROs 830 as part of the solution. The WTRU may assume that gNB could receive the PRACH transmissions mapped to the corresponding SS/PBCH block indexes in the original RO 830 at the same time and without switching gap. The WTRU may determine that gNB may receive the two parts of the original PRACH occasion, decomposed into two consecutive time-domain ROs, without switching gap. The WTRU may not consider/insert any switching gaps in between such consecutive ROs.

Otherwise, between two originally separate ROs: the WTRU may determine that the two consecutive ROs are parts of two consecutive original ROs in time domain and not parts of a decomposition. The WTRU may operate as if the decomposition was already accomplished in the previous PRACH occasion. The WTRU may operate as if the former original PRACH occasion was decomposed into two consecutive time-domain ROs. The WTRU may operate as if the antenna switching was accomplished during the previous PRACH occasion and thorough the decomposition solution. The WTRU may not consider/insert any switching gaps in between such consecutive ROs.

A system and method in a wireless transmit/receive unit (WTRU) for physical random-access channel (PRACH) transmission is disclosed. The system and method include receiving a configuration of PRACH information, the PRACH information including at least one candidate cover-code, performing listen before talk (LBT) in a first random-access channel (RACH) occasion (RO) that is prior to a second RO, on a condition that the LBT is not successful, detecting if there is a first PRACH preamble transmission in the first RO scrambled with a first cover-code from among the at least one candidate cover-code, and based on the detecting, transmitting a second PRACH preamble scrambled with a second cover-code from among the at least one candidate cover-code in the second RO.

The system and method may include the transmitting occurs when the first cover-code is successfully detected in the first RO.

The system and method further comprising based on the detecting, no PRACH preamble is to be transmitted in the second RO due to the LBT failure. The system and method wherein the not transmitting occurs if none of the at least one candidate cover-codes is successfully detected in the first RO.

The system and method further comprising, on a condition that the LBT is successful, transmitting a third PRACH preamble scrambled with a third cover code from among the at least one candidate cover-code in the second RO.

The system and method wherein the detecting if there is a first PRACH preamble transmission in the first RO scrambled with a first cover-code from among the at least one candidate cover-codes enables the WTRU to further determine if the channel is busy.

When the cover-code is detected, the system and method further comprising transmitting PRACH preamble scrambled with the determined cover-code.

The system and method in a wireless transmit/receive unit (WTRU) for physical random-access channel (PRACH) transmission including receiving a configuration of PRACH information, the PRACH information including at least one candidate cover-code, performing listen before talk (LBT) in a first random-access channel (RACH) occasion (RO) that is prior to a second RO, on a condition that the LBT is not successful, detecting if there is a first PRACH preamble transmission in the first RO scrambled with a first cover-code from among the at least one candidate cover-code, and on a condition that the first PRACH preamble transmission scrambled with the first cover-code is detected in the first RO, transmitting a second PRACH preamble scrambled with a second cover-code from among the at least one candidate cover-code in the second RO.

The system and method including, on a condition that no PRACH preamble transmission scrambled with a cover-code from among the at least one candidate cover-code is detected in the first RO, no PRACH preamble is to be transmitted in the second RO due to the LBT failure.

The system and method further comprising, on a condition that the LBT is successful, transmitting a third PRACH preamble scrambled with a third cover code from among the at least one candidate cover-code in the second RO.

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random-access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

What is claimed:

1. A method in a wireless transmit/receive unit (WTRU) for physical random-access channel (PRACH) transmission, the method comprising receiving a configuration of PRACH information, the PRACH information including at least one candidate cover-code;

performing listen before talk (LBT) in a first random-access channel (RACH) occasion (RO) that is prior to a second RO;

on a condition that the LBT is not successful, detecting if there is a first PRACH preamble transmission in the first RO scrambled with a first cover-code from among the at least one candidate cover-code; and based on the detecting, transmitting a second PRACH preamble scrambled with a second cover-code from among the at least one candidate cover-code in the second RO.

2. The method of claim 1, wherein the transmitting occurs when the first cover-code is successfully detected in the first RO.

3. The method of claim 1, further comprising, on a condition that the LBT is successful, transmitting a third PRACH preamble scrambled with a third cover code from among the at least one candidate cover-code in the second RO.

4. The method of claim 1 wherein the LBT identifies if the channel is idle.

5. The method of claim 1 wherein the LBT being unsuccessful is based on the channel being in use.

6. The method of claim 1 wherein the LBT is successful is the channel is idle.

7. The method of claim 1 wherein the detecting if there is a first PRACH preamble transmission in the first RO scrambled with a first cover-code from among the at least one candidate cover-codes enables the WTRU to further determine if the channel is busy.

8. The method of claim 1 wherein when the cover-code is detected, the method further comprising transmitting PRACH preamble scrambled with the detected cover-code.

9. The method of claim 1 wherein the detected cover-code uses Zadoff-Chu sequence xc(n).

10. The method of claim 1 wherein the PRACH transmission occur in consecutive ROs.

11. A wireless transmit/receive unit (WTRU) comprising:

a transceiver; and a processor operatively coupled to the transceiver, the processor and transceiver capable of operating to receive a configuration of PRACH information, the PRACH information including at least one candidate cover-code;

the processor and transceiver capable of operating to perform listen before talk (LBT) in a first random-access channel (RACH) occasion (RO) that is prior to a second RO;

on a condition that the LBT is not successful, the processor and transceiver capable of operating to detect if there is a first PRACH preamble transmission in the first RO scrambled with a first cover-code from among the at least one candidate cover-code; and based on the detecting, the processor and transceiver capable of operating to transmit a second PRACH preamble scrambled with a second cover-code from among the at least one candidate cover-code in the second RO.

12. The WTRU of claim 11, wherein the transmitting occurs when the first cover-code is successfully detected in the first RO.

13. The WTRU of claim 11, further comprising, on a condition that the LBT is successful, the processor and transceiver capable of operating to transmit a third PRACH preamble scrambled with a third cover code from among the at least one candidate cover-code in the second RO.

14. The WTRU of claim 11 wherein the detecting if there is a first PRACH preamble transmission in the first RO scrambled with a first cover-code from among the at least one candidate cover-codes enables the processor and transceiver capable of operating to determine if the channel is busy.

15. The WTRU of claim 11 wherein when the cover-code is detected, the processor and transceiver capable of operating to transmit PRACH preamble scrambled with the detected cover-code.

16. The WTRU of claim 11 wherein the PRACH transmission occur in consecutive ROs.

* * * * *